(12) United States Patent
Nien et al.

(10) Patent No.: US 11,146,085 B2
(45) Date of Patent: Oct. 12, 2021

(54) CHARGING SYSTEM FOR ELECTRIC WINDOW COVERING

(71) Applicant: Nien Made Enterprise Co., Ltd., Taichung (TW)

(72) Inventors: Chao-Hung Nien, Taichung (TW);
Jui-Pin Jao, Miaoli County (TW);
Shih-Wei Hsu, Hsinchu County (TW);
Kao-Chang Hu, Hsinchu (TW);
Chin-Chu Chiu, Hsinchu County (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 107 days.

(21) Appl. No.: 16/655,179

(22) Filed: Oct. 16, 2019

(65) Prior Publication Data

US 2020/0052515 A1    Feb. 13, 2020

Related U.S. Application Data

(63) Continuation-in-part of application No. 15/953,519, filed on Apr. 16, 2018, now Pat. No. 10,847,983.

(60) Provisional application No. 62/486,193, filed on Apr. 17, 2017.

(51) Int. Cl.
*H02J 7/00* (2006.01)
*H02J 7/02* (2016.01)
*E06B 9/322* (2006.01)

(52) U.S. Cl.
CPC .......... *H02J 7/0047* (2013.01); *H02J 7/0042* (2013.01); *H02J 7/025* (2013.01); *E06B 9/322* (2013.01); *E06B 2009/3222* (2013.01)

(58) Field of Classification Search
CPC ....... H02J 17/0047; H02J 7/0042; H02J 7/025
USPC .......................................................... 307/20
See application file for complete search history.

(56) References Cited

U.S. PATENT DOCUMENTS

| | | | |
|---|---|---|---|
| 5,065,249 A | 11/1991 | Horn | |
| 6,062,290 A | 5/2000 | Domel | |
| 6,910,515 B2 * | 6/2005 | Nien | ........................ E06B 9/32 |
| | | | 160/168.1 P |

(Continued)

FOREIGN PATENT DOCUMENTS

| CN | 201367835 Y | 12/2009 |
|---|---|---|
| CN | 204764900 | 11/2015 |

(Continued)

*Primary Examiner* — Michael R. Fin
(74) *Attorney, Agent, or Firm* — Winston Hsu

(57) ABSTRACT

A charging system for an electric window covering, which includes a motorized assembly controlling the movement of the electric window covering, and a power supply device including a rechargeable power unit and a first remaining power detection circuit is disclosed. The charging system comprises a charging device which provides power to the power supply device, a comparison module, and a notification unit. The first remaining power detection circuit detects the potential magnitude of the power unit, and the detected value is transmitted to the comparison module to be compared. If the potential magnitude is less than a predetermined threshold, a warning is presented at a notification unit. By actively presenting the warning to the user when the power of the power unit is low, the power supply device and the charging system can achieve the objectives of providing an active notification and extending the run-time of the power unit.

11 Claims, 38 Drawing Sheets

(56) References Cited

U.S. PATENT DOCUMENTS

| | | | |
|---|---|---|---|
| 7,389,806 B2* | 6/2008 | Kates | E06B 9/32 160/5 |
| 8,091,606 B2 | 1/2012 | Nien | |
| 9,514,638 B2 | 12/2016 | Hall | |
| 9,840,870 B2 | 12/2017 | Lu | |
| 2005/0011615 A1 | 1/2005 | Nien | |
| 2005/0011616 A1 | 1/2005 | Nien | |
| 2005/0206325 A1 | 9/2005 | Wakou | |
| 2007/0065138 A1 | 3/2007 | Miller | |
| 2009/0241840 A1 | 10/2009 | Mills | |
| 2011/0215769 A1* | 9/2011 | Huang | H02J 7/00 320/145 |
| 2015/0288316 A1 | 10/2015 | Hall | |
| 2017/0194802 A1* | 7/2017 | Edwards | B60L 53/31 |
| 2018/0175662 A1 | 6/2018 | Zara | |

FOREIGN PATENT DOCUMENTS

| | | |
|---|---|---|
| CN | 205693393 U | 11/2016 |
| CN | 110005331 A | 7/2019 |
| DE | 20 2016 006 336 U1 | 11/2016 |
| EP | 3091170 A1 | 11/2016 |
| EP | 3128115 A1 | 2/2017 |
| JP | H01102398 U | 7/1989 |
| JP | 200419287 A | 1/2004 |
| JP | 200536611 A | 2/2005 |
| JP | 2018106319 A | 7/2018 |
| TW | 539799 | 7/2003 |

\* cited by examiner

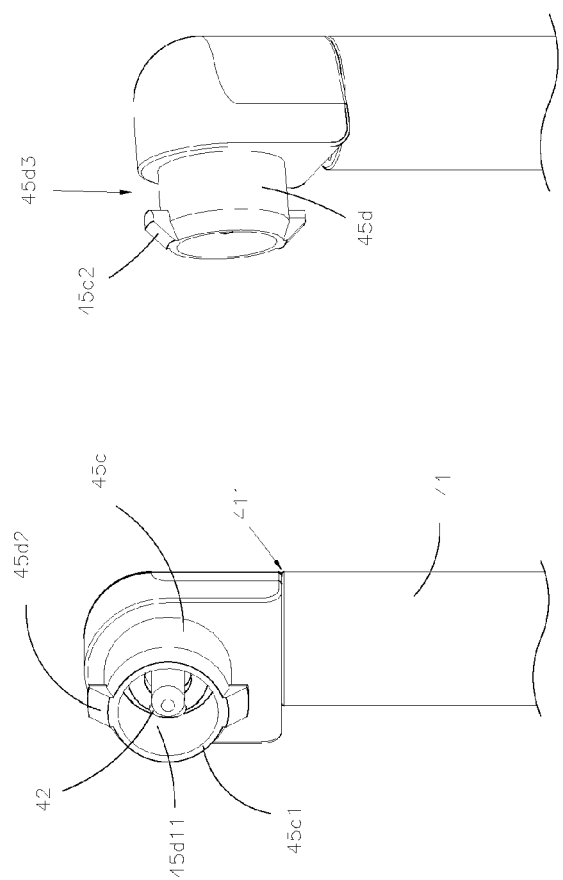

CHARGING SYSTEM FOR ELECTRIC WINDOW COVERING

CROSS REFERENCE TO RELATED APPLICATIONS

This application is a continuation in part of U.S. patent application Ser. No. 15/953,519 titled "CHARGING SYSTEM FOR ELECTRIC WINDOW COVERING AND METHOD OF CHARGING ELECTRIC WINDOW COVERING WITH THE SAME", which claims the benefit of U.S. Provisional Patent Application 62/486,193, filed Apr. 17, 2017. The contents of this application are hereby incorporated by reference.

BACKGROUND OF THE INVENTION

1. Field of the Invention

The present invention relates generally to an electric window covering, and more particularly to an electric window covering which actively presents a warning notice to inform the user about the power status of the power supply device only when the electric power stored in the power supply device of the electric window covering reaches a low level, whereby the objective to remind the user to charge the electric window covering could be achieved without unduly consuming the power of the power supply device, and therefore the stand-by time would not be affected.

2. Description of the Prior Art

Generally, a window covering includes a headrail, a covering material provided below the headrail, and a control mechanism, wherein the control mechanism is mostly provided inside the headrail, and can be operated to move the covering material. When driven to operate by force, the control mechanism opens or closes the covering material, whereby to adjust the coverage of the covering material on an opening (e.g., a window or a door) of a building.

Conventional ways to control the movements of covering materials can be roughly divided into two categories: by manual and by electric means. Manually operated window coverings typically use a cord as the medium to transmit the force provided by a user to the control mechanism inside the headrail. However, it is not uncommon to see an exposed cord accidentally form a loop, leading to potential strangulation incidents involving children. Though several manufacturers have developed cordless window coverings, which have no exposed cords, and are safer than corded ones, the adjustable range of the covering material is limited by the reachability of the user, i.e., depending on how high a user can reach. At least for this reason, cordless window coverings would not be deemed ideal products. Furthermore, no matter what kind of manual means is applied for operating a manually operated window covering, the weight of the covering material would be withstood merely by human power. Thus, this kind of window coverings is inconvenient to use. Thanks to the popularity of electricity applications in recent years, the industry of making window coverings gradually turns toward utilizing electricity to move the covering material, aiming to solve these drawbacks regarding manually operated window coverings.

In general, electric window coverings have a motorized tube powered by electricity, which is provided in or near the headrail. An output end of the motorized tube is an output shaft, of which the motion correlates with that of a reel. When the motorized tube starts to operate after receiving an activating signal, it drives the output shaft to rotate, and then the output shaft correlatively rotates the reel, opening or closing the covering material as a result. Typically, the motorized tube of an electric window covering would be provided close to the reel, for such arrangement has the advantage of reducing energy loss happened during the process of transmitting the rotary force from the motorized tube to the reel. Such an electric window covering does not need an exposed cord, and the motorized tube thereof could be controllable by remote control means, which means the inherent limitation on the installation height of a window covering can be excluded. Therefore, electric window coverings should have the potential to be widely used by the public.

Nevertheless, since electricity is taken as a source of power for electric window coverings, if the power supply device is far from where an electric window covering is installed, a power transmission wire connecting the two would be required for transmitting electricity to the electric window covering and for powering the motorized tube. However, if the power transmission wire cannot be hidden behind walls or decorations of the room for any reason, it would appear abrupt, and spoil the overall appearance of the room. In addition, in some regions, power transmission wires cannot be installed anywhere simply by requirements, as some installation locations are forbidden by safety regulations. In such a case, the locations to install electric window coverings are thus limited, which would affect consumers' willingness to use electric window coverings.

To overcome the limitations above, power supply devices which have the ability to store power (e.g., batteries) can be used to provide electricity to electric window coverings in the circumstances not suitable for installing power transmission wires. However, such a power supply device has limited capacity, and once it runs out of power, it has to be replaced. Furthermore, in the purpose of powering the motor efficiently and reducing energy loss during power transmission, this kind of power supply devices are usually located in or near the headrail, i.e., located around the top edge of the window, which makes replacing batteries a troublesome job. In this regard, designs with external batteries have been developed to lessen the inconvenience. Take U.S. Pat. No. 6,910,515 as an example, the headrail disclosed therein is provided with a conductive terminal, which is exposed out of the headrail and is connected to a motor assembly provided in the headrail. Another conductive terminal is provided on a top end of a suspending rod, which contains a battery inside. The battery and the conductive terminal on the top of the suspending rod are coupled. By electrically connecting the conductive terminal on the top of the suspending rod and the conductive terminal at the headrail, the power of the battery in the suspending rod can be transmitted to the motor assembly through the connected conductive terminals, whereby to power the motor assembly. In short, this patent solves the problem of inconvenient battery replacement by providing external electric power through the suspending rod. Taiwanese Patent No. TW539799 is another example, which discloses an electric window covering including not only a headrail and a movable covering material, but also a control system. The control system includes a linking device provided at the headrail, and a driving device which can be separated from the window covering. A motor and a power source are provided inside a front end of the driving device, wherein the power source powers the motor. The driving device further has a force output extending from the front end thereof, wherein the force output can be driven and rotated by the motor. The driving device has a control switch provided on a rear end thereof to be coupled to the motor. The linking device includes a force input and an actuating portion which are exposed out of the headrail, wherein the force input can be connected to the force output, whereby to connect the driving device and the linking device. On the other hand, the actuating portion is directly or indirectly connected to the movable covering material. When the motor rotates the force output, and the force input is moved by the force output to rotate as well, the actuating portion is rotated along with the rotation of the force input, whereby to open or close the movable covering material correspondingly.

In summary, the aforementioned electric window coverings both have a long rod connected to the headrail, either to power the motor assembly provided in the headrail, or to supply a rotary force to the linking device which is also provided in the headrail. To serve the above functions, the long rod at least contains a power source or a driving device. For consideration of the convenient use of this kind of electric window coverings (for example, using a remote control to control the operation of such a window covering), the long rod has to be permanently suspended under the headrail. However, with a battery to provide power or a motor to drive the driving device, the long rod would be somewhat heavy, generating a lasting downward pulling force at where the headrail and the long rod are connected. Therefore, the headrail may tilt by having the long rod suspended below for a long time. Furthermore, a window covering with a permanently suspended long rod occupies more space, leading to a higher possibility that someone may bump into the long rod, which may cause damage to the long rod or the junction between the long rod and the headrail. People may even get hurt from that. In addition, a permanent suspended long rod would also affect the appearance of the room. Furthermore, the aforementioned electric window coverings both have a connecting structure exposed out of the headrail to be connected to the motor assembly or the linking device, so as to engage the long rod with the connecting structure to transmit electric power or driving power. The exposed connecting structure would spoil the totality of the appearance of an electric window covering, impairing the aesthetic feeling provided by the overall design of the electric window covering.

In addition, some types of electric window coverings use rechargeable secondary batteries to avoid the inconvenience of replacing batteries. Such electric window coverings have a charging connector provided at the headrail, and once the secondary battery runs out of power, it can be recharged by providing electric power to the charging connector, as disclosed in Chinese Patents No. CN201367835Y, No. CN205693393U, No. CN204764900, and European patent No. EP3128115A1. However, in order to effectively provide power to the motorized assembly provided in the headrail, a power supply device is usually fixed at a location near the headrail, or even directly installed in the headrail, which is above the top of the window. Therefore, tools (e.g., ladders) are still needed for users to approach the charging connectors while trying to charge the secondary batteries. Alternatively, there can be a charging cable hanging from the headrail, wherein an end of the charging cable inside the headrail is connected to the secondary battery which is also inside the headrail, while another end of the charging cable is exposed outside and is provided with a connecting end. With such design, the connecting end can be connected to an external power source, whereby the electric power can be provided to the rechargeable battery through the charging cable to recharge the battery, as disclosed in U.S. Pat. No. 9,514,638.

However, charging a rechargeable battery with an exposed charging cable is still not a perfect solution, for such an exposed charging cable could be unintentionally wound into a loop, creating a potential hazard, and could also affect the overall appearance of the corresponding electric window covering. On the other hand, providing electric power to the rechargeable battery through a charging connector at the headrail would pose a limitation on the installation height as well, for it would be difficult to charge a corresponding power supply device if the charging connector is installed too high. Therefore, how to charge an electric window covering conveniently and safely has become a major issue that needs to be resolved in the related industry.

Furthermore, even if the above-mentioned issue regarding the inconvenience of replacing battery is resolved by improving the ways of charging the rechargeable battery in an electric window covering, there would pose another problem of when to recharge the rechargeable battery and how to know its current capacity. To resolve this problem, the power supply device of an electric window covering could further include a first remaining power detection circuit and a first display unit, wherein the first remaining power detection circuit detects the capacity of the first rechargeable battery inside the power supply device, and the first display unit can be fixed on the housing of the electric window covering, on a remote control, on a cellphone, or on other portable devices. Signal transmissions between the first remaining power detection circuit and the first display unit is performed either wirelessly or through physical connections. The current power status of the first rechargeable battery detected by the first remaining power detection circuit is constantly or periodically sent to the first display unit for display, so that a user could monitor the current capacity of the first rechargeable battery at any desired time, and could accordingly decide when to charge the first rechargeable battery.

However, in the condition that the first rechargeable battery does not need to be recharged, frequently or periodically displaying the current power status of the first rechargeable battery or transmitting signals regarding the power status of the first rechargeable battery to other devices to be displayed thereon would unnecessarily waste the power of the first rechargeable battery. Therefore, an issue to be improved is on how to actively send out a warning notice to remind the user to charge the first rechargeable battery only when the first rechargeable battery needs to be charged, by which the unnecessary power consumption of the first rechargeable battery could be avoided, and the run-time of the first rechargeable battery would not be shortened.

SUMMARY OF THE INVENTION

One aspect of the present invention is to provide a charging system for an electric window covering, and a method of charging the electric window covering with said charging system. By utilizing an extensible charging device, an electric power output of the charging device could provide power to a power supply device of the electric window covering through an electric power input of the electric window covering, whereby to charge the power supply device. Since the charging device has certain extensibility, users could easily and effortlessly charge electric window coverings installed at different heights. Therefore, the annoyance of charging the power supply device of the electric window covering could be eliminated.

Furthermore, one objective of the present invention is to provide a charging system for an electric window covering, which uses a first remaining power detection circuit to detect the potential magnitude of a power unit composed by a first rechargeable battery. Said potential magnitude can be compared with a threshold predetermined in the comparison module. If the potential magnitude is less than the threshold, the comparison module generates and outputs a warning notice signal, which is then transmitted to a presenting module to be presented as a warning notice. In other words, the warning notice signal, which informs the user that the power unit needs to be charged, is only actively sent out to the presenting module when the potential magnitude of the power unit reaches a lower boundary. Therefore, in the situation that the power unit still has sufficient power, the power unnecessarily consumed to display the current power status could be avoided. In this way, power could be saved, and the run-time of the power unit for providing power to the electric window covering could be extended.

The present invention provides a charging system for an electric window covering, wherein the electric window covering includes a motorized assembly, which controls a movement of the electric window covering, a rechargeable power supply device, and an electric power input, which is provided at a frame, and is coupled to the power supply device. The power supply device is coupled to the motorized assembly to provide power to the motorized assembly. The charging system includes a charging device, wherein the charging device includes an extension object which has a stiffness, an electric power output, and a power storage device adapted to store an electric power therein. The extension object is adapted to erect in a longitudinal direction thereof, and has a first connecting portion and a second connecting portion provided in the longitudinal direction thereof. The electric power output is provided near the first connecting portion. The power storage device is connected to the second connecting portion in a separable manner. The electric power output and the power storage device have an electrical conductivity therebetween. The charging device is optionally connected to the frame and suspended therefrom. The first connecting portion of the extension object is close to the frame, so that the power storage device is adapted to transmit the electric power to the electric power output through the extension object, and the electric power output is adapted to provide the electric power to the electric power input, whereby to transmit the electric power to the power supply device through the electric power input to charge the power supply device.

The present invention also provides a method of charging an electric window covering with said charging system, wherein the electric window covering includes a motorized assembly, which controls a movement of the electric window covering, a rechargeable power supply device, and an electric power input, which is provided at a frame, and is coupled to the power supply device. The power supply device is coupled to the motorized assembly to provide power to the motorized assembly. The method includes the following steps: a) provide said charging system; b) move the extension object to make the first connecting portion of the extension object approach the frame, whereby to remain the charging device connected to the frame and suspended therefrom; transmit the electric power of the power storage device to the electric power output through the extension object, and then provide the electric power to the electric power input to charge the power supply device; and d) finish charging the power supply device.

To achieve the above-mentioned objective, the present invention provides a charging system for an electric window covering, wherein the electric window covering comprises a motorized assembly, which controls a movement of the electric window covering, and a power supply device, which comprises a rechargeable power unit and a first remaining power detection circuit, wherein the power unit is coupled to and provides power to the motorized assembly, and the first remaining power detection circuit is coupled to the power unit to detect a potential magnitude of the power unit. The first remaining power detection circuit generates and outputs a potential signal. The charging system includes a charging device, a comparison module, and a notification unit, wherein the charging device provides power to the power unit of the power supply device, and the comparison module is coupled to the first remaining power detection circuit of the power supply device. The potential signal outputted by the first remaining power detection circuit is inputted into the comparison module to be compared. When the potential magnitude represented by the potential signal is less than a threshold predetermined in the comparison module, the comparison module generates and outputs a warning notice signal. The notification unit includes a presenting module, which receives the warning notice signal outputted by the comparison module and represents a warning notice representing the warning notice signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will be best understood by referring to the following detailed description of some illustrative embodiments in conjunction with the accompanying drawings, in which:

FIG. 43 is a perspective view of the engaging portion of the seventh embodiment of the present invention;

FIG. 44 is another perspective view of the engaging portion of the seventh embodiment of the present invention viewed from another angle;

DETAILED DESCRIPTION

Figure 17:
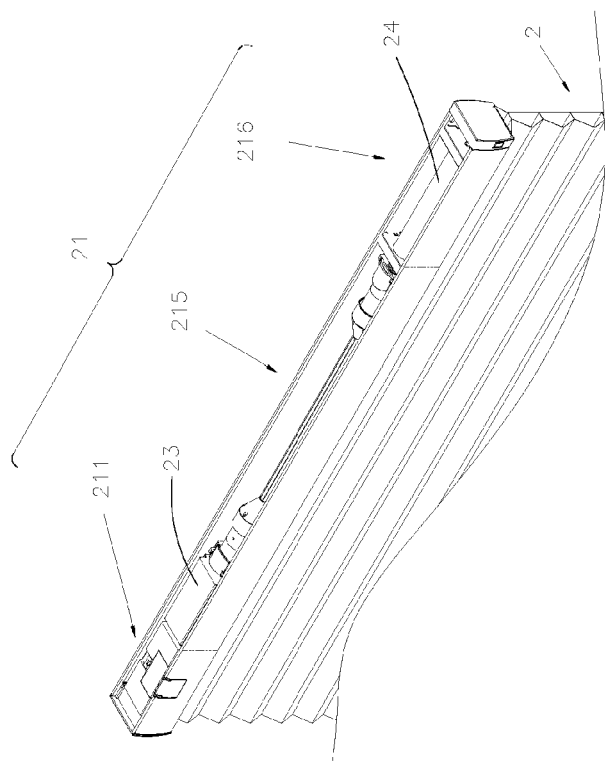
FIG. 17 is a perspective view of an electric window covering applied with the charging system of a first embodiment of the present invention.
Figure 18:
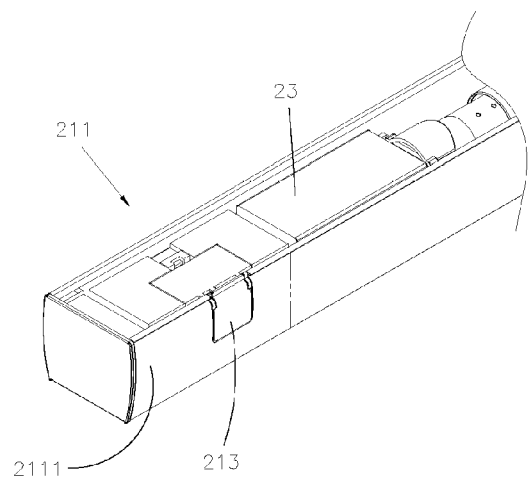
FIG. 18 is a schematic view showing the frame applied with the first embodiment of the present invention.

As described above, FIG. 1 is a block diagram showing a system that a charging system of the present invention provides power to an electric window covering, and FIG. 17 is a perspective view of an electric window covering 2 applied with a charging system of a first embodiment of the present invention. Said electric window covering 2 includes a housing 21, an electric power input 22, a rechargeable power supply device 23, and a motorized assembly 24, wherein the electric power input 22 is provided in a frame 211, the power supply device 23 is provided in a first seat 215, and the motorized assembly 24 is provided in a second seat 216. To be specific, the first seat 215 is used to accommodate the power supply device 23, and the second seat 216 is used to accommodate the motorized assembly 24. The power supply device 23 includes a first rechargeable battery 231 and a first charging module 232, wherein the first rechargeable battery 231 is coupled to the motorized assembly 24, whereby to provide electric power to the motorized assembly 24, so that the motorized assembly 24 could drive a covering material of the electric window covering 2 to open or close. The first charging module 232 is respectively coupled to the electric power input 22 and the first rechargeable battery 231, and is capable of controlling a charging procedure of the first rechargeable battery 231. It has to be noted that, the aforementioned coupling relationships between the components are not limitations in implementing the power supply device 23. The first rechargeable battery 231 could also provide power to the motorized assembly 24 through, as required, other circuit modules.

In the aforementioned structure, the frame 211, the first seat 215, and the second seat 216 could be independent components which respectively fix or accommodate the electric power input 22, the power supply device 23, and the motorized assembly 24. Alternatively, the frame 211, the first seat 215, and the second seat 216 could also be, in consideration of the purpose of modularization or easy assembling, integrally made as one single housing 21. In such a case, the electric power input 22, the power supply device 23, and the motorized assembly 24 or other mechanical components which are adapted to drive the electric window covering 2 are all provided in the housing 21, forming a modular component which is convenient for assembling. The housing 21 described throughout the whole specification is modularized as an example for explaining the concept of the present invention, and the housing 21 at least includes the frame 211, so that the electric power input 22 can be directly or indirectly provided therein to be properly positioned.

The charging system applied to the electric window covering 2 includes a charging device 4, which at least includes an extension object 41 having a stiffness, an electric power output 42, and a power storage device 43. By saying that the extension object has the stiffness, what we mean here is that, when the extension object 41 is held by a bottom end thereof and erected, the extension object 41 could keep in a rigid and upright state. The extension object 41 has a first connecting portion 411 and a second connecting portion 412 which are provided in a longitudinal direction thereof. In the current embodiment, the charging device 4 further includes a conductor 44, which is provided in the longitudinal direction of the extension object 41, and is adapted to be fixed thereon. The conductor 44 has a first end 441 and a second end 442, wherein the first end 441 is provided at a location corresponding to the first connecting portion 411 of the extension object 41, and is coupled to the electric power output 42; the second end 442 is provided at a location corresponding to the second connecting portion 412, and is coupled to the power storage device 43. The conductor 44 fixed on the extension object 41 has an inherent conductivity, and therefore could transmit electric power between the electric power output 42 and the power storage device 43. Whereby, the power stored in the power storage device 43 could be transmitted to the electric power output 42.

When the charging device 4 is connected to the frame 211, the first connecting portion 411 of the extension object 41 is close to the frame 211. At this time, the electric power stored in the power storage device 43 could be transmitted through the conductor 44 provided in the extension object 41, passing through the conductor 44 from the second end 442 thereof to the first end 441 thereof. In other words, the electric power could be transmitted from the location corresponding to the second connecting portion 412 of the extension object 41 to the location corresponding to the first connecting portion 411, and then transmitted to the electric power output 42, whereby to provide the electric power to the electric power input 22 provided in the frame 211, so that the first rechargeable battery 231 could be charged through the first charging module 232. Furthermore, while the charging process is going on, the charging device 4 could be kept connected to the frame 211 and suspended therefrom through a fixing means, and therefore it would be not necessary to hold the charging device 4 by hand the whole time.

With the aforementioned design, when it is needed to charge the power supply device 23 of the electric window covering 2, a user would only need to utilize the stiffness of the extension object 41 by holding the bottom end of the charging device 4 and directly moving the charging device 4 toward the housing 21. Once the charging device 4 is kept connected to the frame 211 and is suspended therefrom, the electric power could be transmitted from the power storage device 43 to the electric power output 42 through the extension object 41 or the conductor 44 fixed to the extension object 41. After that, the electric power could be provided to the electric power input 22 which is provided in the frame 211, and then transmitted to and recharge the first rechargeable battery 231 of the power supply device 23. In this way, a user could get rid of the annoyance of using a ladder or other ways to approach the power supply device 23 simply because the batteries need to be replaced or recharged. When charging is completed, the charging device 4 could be disengaged from the frame 211, and then the fully charged power supply device 23 could start to provide power to the motorized assembly 24 or other electronic control components. No external electric power or driving power would be needed.

The aforementioned first rechargeable battery 231 of the power supply device 23 can be a nickel-metal hydride rechargeable battery, a nickel-zinc rechargeable battery, or a lithium-ion rechargeable battery. However, this is not a limitation for the selection of the first rechargeable battery 231; any rechargeable secondary batteries can be an option for carrying out the above design. In practice, the first rechargeable battery 231 can be integrally bond with the first charging module 232, so that these two components can be efficiently installed in the first seat 215 (or the integrally made housing 21) as a whole. In yet another embodiment, the first rechargeable battery 231 can solely serve as a power unit 231*a* or make up a power unit 231*a* with other first rechargeable batteries in an integrated manner. Further in another embodiment, the power unit 231*a* and the first charging module 232 can be integrated into a single component.

Figures 1, 2:
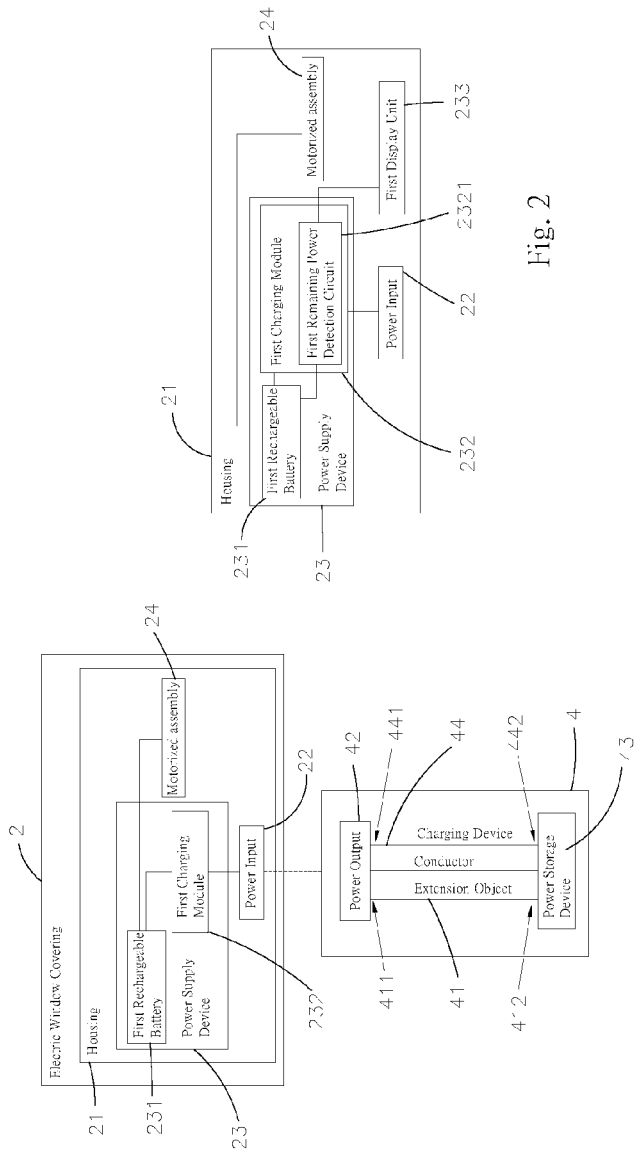
FIG. 1 is a block diagram showing a system that the charging system of the present invention provides power to an electric window covering.
FIG. 2 is a block diagram showing an implementation of the power supply device, by which a remaining power detection function is provided.

Please refer to FIG. 2 and FIG. 17, wherein FIG. 2 is a block diagram showing an implementation of the power supply device described in the specification, by which a remaining power detection function could be provided. As shown in FIG. 2, the first charging module 232 of the power supply device 23 at least includes a first remaining power detection circuit 2321. To better control the charging procedure of the first rechargeable battery 231, the first charging module 232 could further include a first discharging control circuit, a first charging control circuit, a first protection control circuit, and a first switching circuit, wherein the conditions which are preventable by the first protection control circuit include, but not limited to, overcharge, overvoltage, over discharge, overload, overheat, and short circuit. The first switching circuit is not shown in the drawings, for it is a well-known technique related to charging modules, and therefore we are not going to describe it in details herein.

Figure 19:
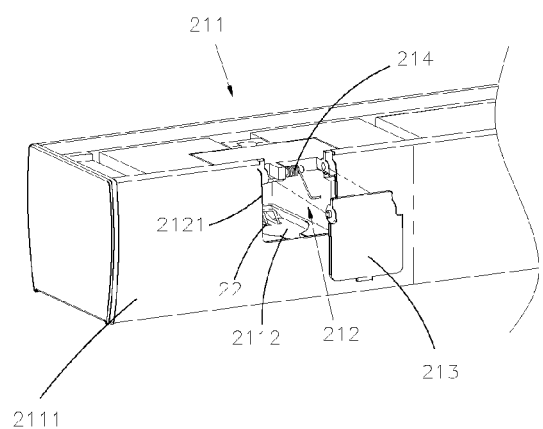
FIG. 19 is a schematic view showing the inside of the frame illustrated in FIG. 18.
Figure 26:
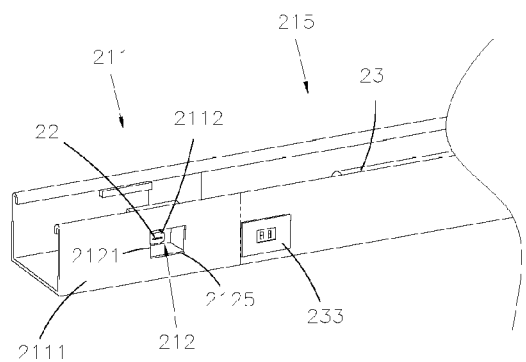
FIG. 26 is a perspective view of the frame applied with a second embodiment of the present invention.
Figure 27:
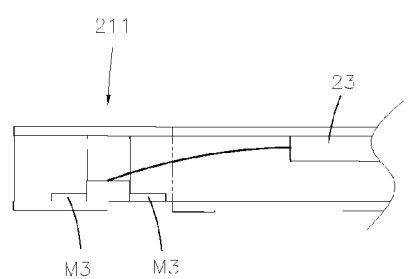
FIG. 27 is a top view of the frame shown in FIG. 26.
Figure 39:
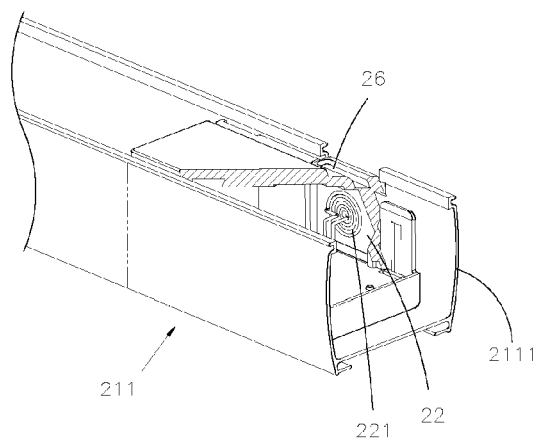
FIG. 39 is another perspective view of the frame shown in FIG. 38 viewed from another angle.

In the designs mentioned in the specification, the electric power input 22, which is provided in the frame 211, roughly includes at least one of the following parts which could be used for electrical coupling: a pin, a pin socket, a connector, a USB connector, a plug, a socket, and an electrical coupling point. Furthermore, the electric power input 22 could include a receiver coil module 221 (as shown in FIG. 39), which could receive an electromagnetic signal, covert the received electromagnetic signal into electric power, and then transmit to the first charging module 232, whereby to perform the charging procedure on the first rechargeable battery 231. In the aforementioned designs, the frame 211 further has a first terminal block 2112, and the electric power input 22 is fixed at the first terminal block 2112 (as shown in FIG. 19 and FIG. 26).

Figure 3:
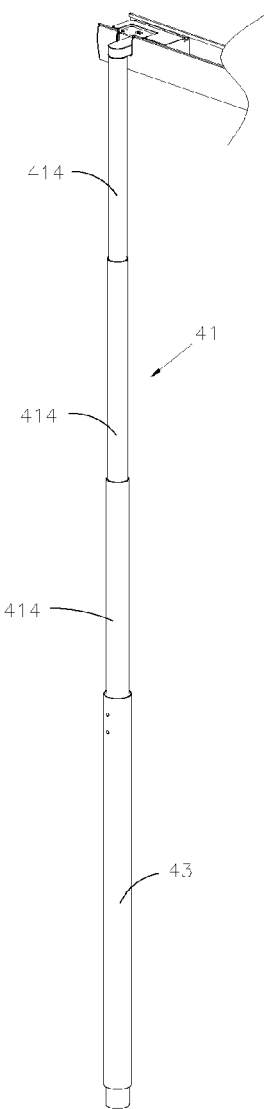
FIG. 3 is a schematic view showing the length-adjustable extension object of the present invention.
Figure 5:
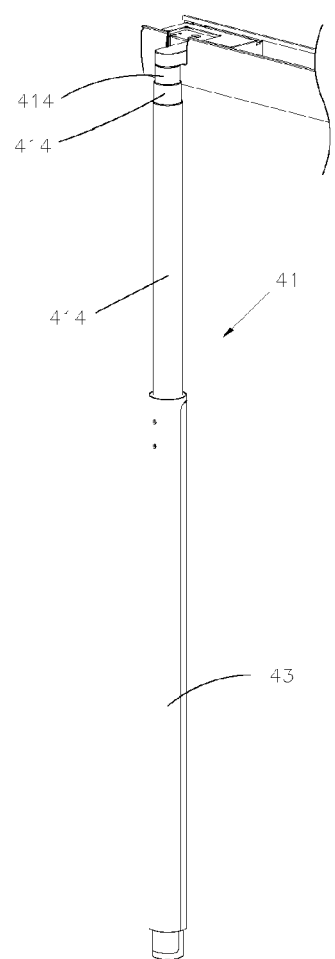
FIG. 5 is a schematic view, showing the use situation of the extension object shown in FIG. 3.
Figure 6:
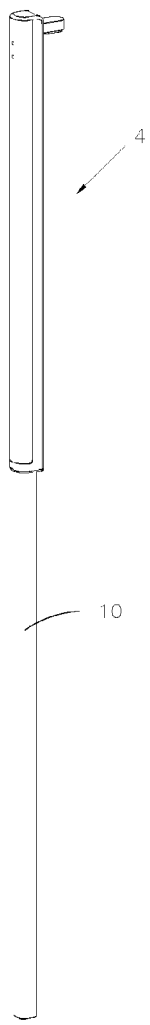
FIG. 6 is a schematic view showing the extension object of the present invention is connected to the support bar.
Figures 20, 21:
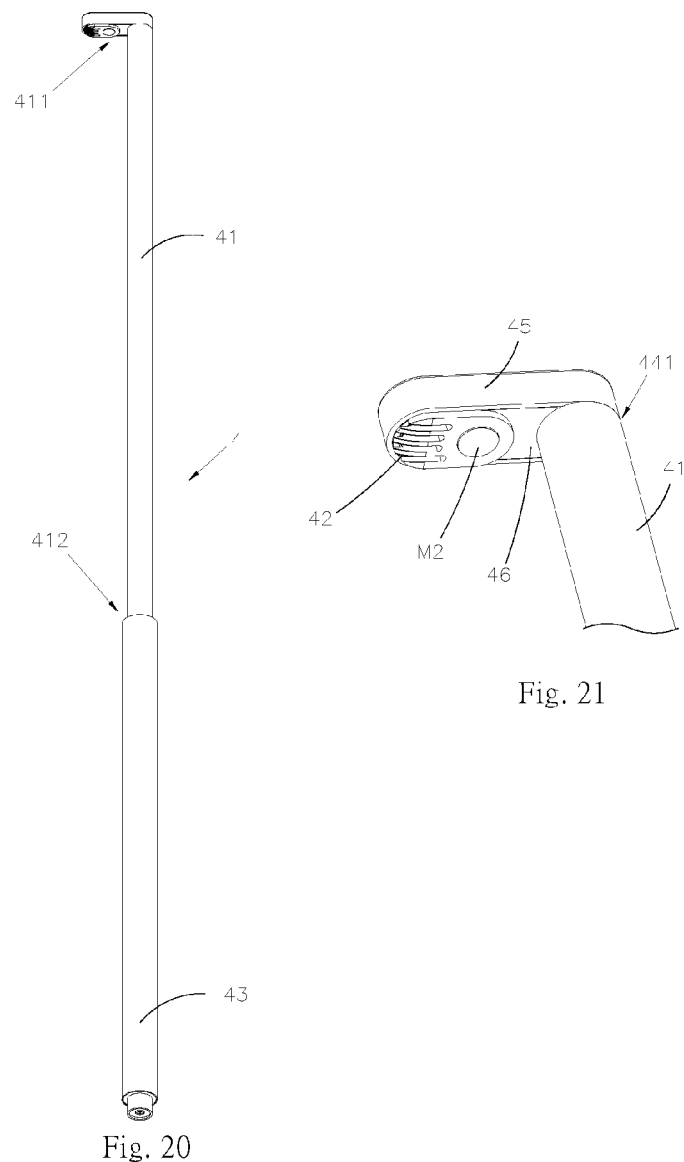
FIG. 20 is a perspective view of the charging system of the first embodiment of the present invention.
FIG. 21 is an enlarged perspective view of the engaging portion shown in FIG. 20.

Based on the components of the aforementioned charging system, the extension object 41 of the charging device 4 of the present invention can be a long object which has the stiffness, or a long object which not only has the stiffness but also is extensible. In other words, the extension object 41 should be able to be erected in a longitudinal direction of the long object, having the first connecting portion 411 and the second connecting portion 412 provided in the longitudinal direction of the extension object 41, as shown in FIG. 20. In an embodiment, the extension object 41 is a long object which has the stiffness and a fixed length, e.g., a long pole; in another embodiment, the extension object 41 has a communicated space 413 provided in the longitudinal direction thereof, such as a hollow tube shown in FIG. 22. In addition, as in yet another embodiment shown in FIG. 3 to FIG. 5, the extension object 41 is a long extensible object which has the stiffness, and is formed by connecting a plurality of stiff sleeves 414 in various ways. For example, the sleeves 414 could be connected by fitting one around another in an overlapping manner (i.e., by joining), whereby some of the sleeves 414 could be pulled out to achieve a required length for the extension object 41. Alternatively, the sleeves 414 could be connected in an axial direction through connecting means such as by being screwed, wherein the number of the sleeves 414 connected through being screwed could be adjusted depending on the required length of the extension object 41. Alternatively, the sleeves 414 could also be connected in a manner that one adjacent and pivotally connected to another, whereby every two adjacent sleeves 414 could be pivoted relative to each other, changing between the state of coaxially extending and the state of being folded together. In this way, the required length of the extension object 41 could be achieved by adjusting the number of the sleeves 414 that extend coaxially. In each embodiment that the sleeves 414 are connected to constitute the extension object 41, each of the sleeves 414 could respectively have a channel 4141 extending in the longitudinal direction thereof. When the sleeves 414 are connected to constitute the extension object 41, the channels 4141 would communicate with each other to form the continuous communicated space 413 inside the extension object 41. In further another embodiment, the extension object 41 is another kind of long extensible object which also has the stiffness, e.g., a flexible gooseneck tube which could be bent and fixed at any angle. Depending on the required length of the extension object 41, the gooseneck tube could be bent accordingly to adjust an overall length thereof, whereby to achieve the objective of adjusting the length of the extension object 41. As shown in FIG. 6, in one more embodiment, the bottom end of the charging device 4 is further connected to a support bar 10 in the longitudinal direction thereof, wherein the support bar 10 could be used to extend the length of the charging device 4 in its longitudinal direction, which would be suitable for charging a window covering installed at a high position.

Figure 4:
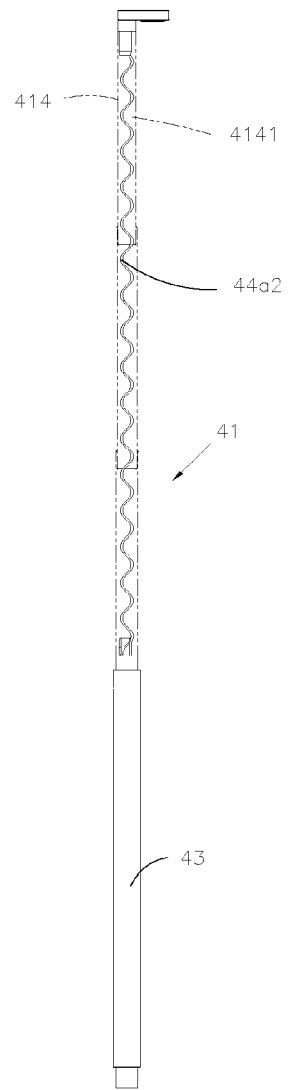
FIG. 4 is a schematic view showing the extension object shown in FIG. 3 is applied with the conductor.
Figure 22:
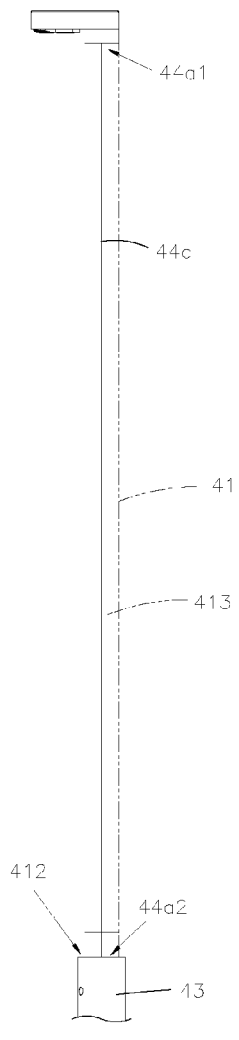
FIG. 22 is a schematic view of the extension object of the charging device in the first embodiment of the present invention.
Figures 28A, 28B, 28C:
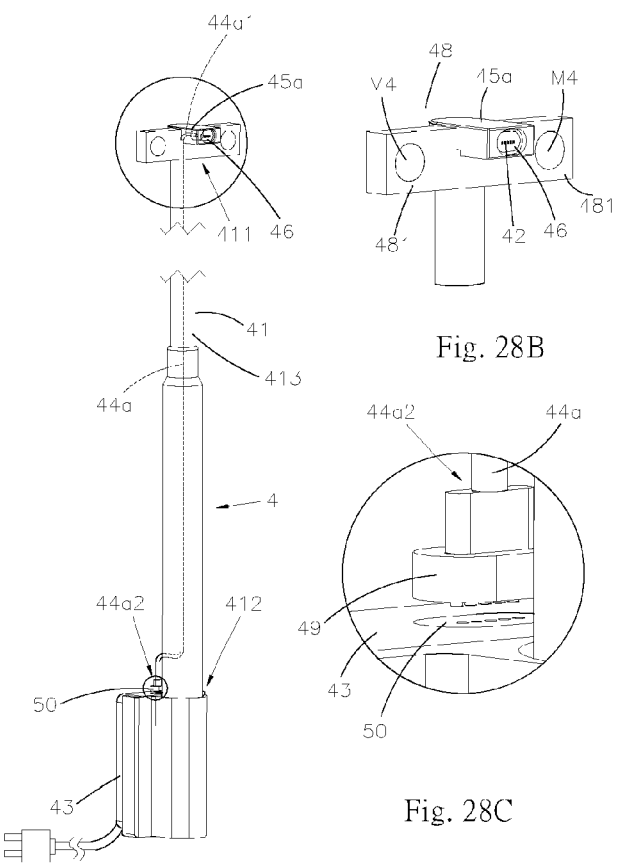
FIG. 28A is a perspective view of the charging system of the second embodiment of the present invention.
FIG. 28B is a partial enlarged view of the engaging portion shown in FIG. 28A.
FIG. 28C is a partial enlarged view, showing the power storage device of FIG. 28A is connected to the wire through the electrical connector.

Please refer to FIG. 1 again, in the embodiments of the present invention, the charging device 4 further includes the conductor 44, which goes through, provided in, or fixed on the extension object 41 in the longitudinal direction thereof. The conductor 44 has the first end 441 and the second end 442, wherein the first end 441 of the conductor 44 is provided at the location corresponding to the first connecting portion 411 of the extension object 41, while the second end 442 of the conductor 44 is located at the location corresponding to the second connecting portion 412 of the extension object 41. When electric power is transmitted from the second end 442 to the first end 441 along the conductor 44, it is transmitted from the location corresponding to the second connecting portion 412 to the location corresponding to the first connecting portion 411 in the longitudinal direction of the extension object 41. In an embodiment, the conductor 44 can be a wire 44a wrapped in an insulating layer, wherein the wire 44a can be fixedly attached to an outer surface of the extension object 41, or provided in the communicated space 413 inside the extension object 41 (as shown in FIG. 22 and FIG. 28) in the longitudinal direction of the extension object 41. As shown in FIG. 4 and FIG. 5, in another embodiment, the conductor 44 can be a spiral wire 44a2 provided in the communicated space of the extension object 41. While adjusting the length of the extension object 41, the spiral wire 44a2 could be relatively compressed or extended depending on the length of the extension object 41. In yet another embodiment, the conductor 44 can be a conductive strip plated on a surface of the extension object 41 or a wall of the communicated space of the extension object 41. In one more embodiment, the conductor and the extension object can be combined into one single component, wherein the first end of the conductor is the first connecting portion of the extension object, and the second end of the conductor is the second connecting portion of the extension object, wherein electric power could be transmitted from the second connecting portion to the first connecting portion along the extension object.

Figures 7, 8:
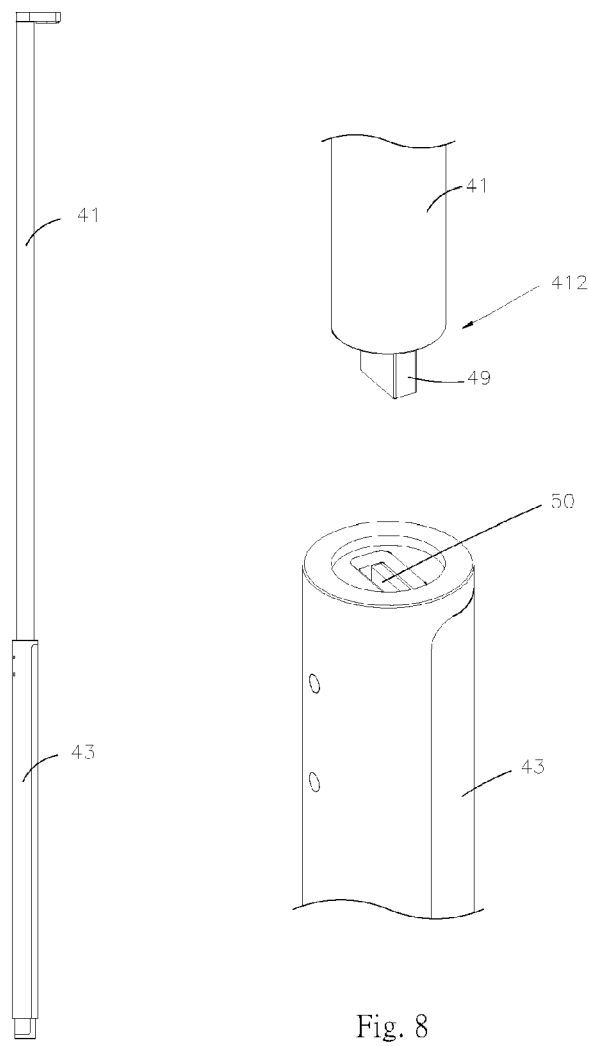
FIG. 7 is a perspective view of the charging device of the present invention.
FIG. 8 is a schematic view showing how the extension object and the power storage device are connected in the present invention.
Figure 10:
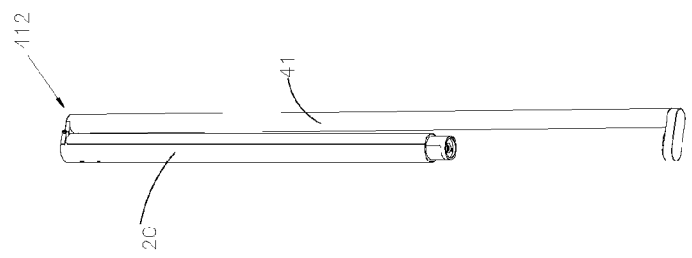
FIG. 10 is a schematic view showing the use situation of FIG. 9A.
Figure 9B:
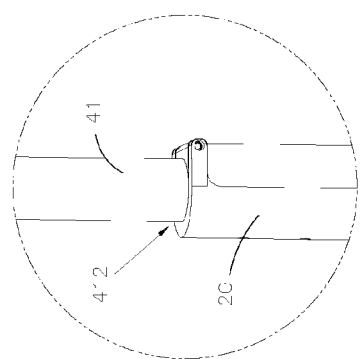
FIG. 9B is a partial enlarged view of FIG. 9A.
Figure 9A:
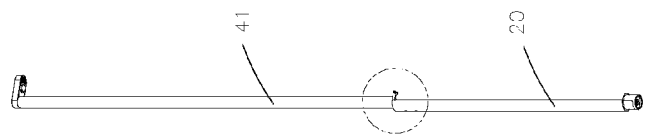
FIG. 9A is a schematic view showing the extension object and the power storage device are pivotable relative to each other in the present invention.
Figure 23:
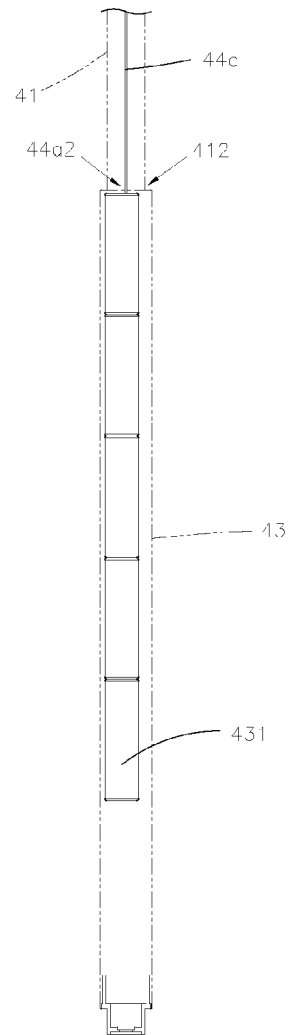
FIG. 23 is a schematic view of the power storage device of the charging device in the first embodiment of the present invention.

In the current embodiment of the present invention, the power storage device 43 is detachably coupled to the second end 442 of the conductor 44 which is located at the position corresponding to the second connecting portion 412 of the extension object 41. Alternatively, in the case that conductor 44 and the extension object 41 are combined into one single component, the power storage device 43 is detachably connected to the second connecting portion 412 of the extension object 41. The power storage device 43 is a portable power source which can store electric power, or a storage battery capable of storing electric power. In an embodiment, the power storage device 43 is coupled to the second connecting portion 412 or the second end 442 of the conductor 44 through a wire 44a which is used as a medium, so that the power in the power storage device 43 could be transmitted to the second connecting portion 412 or second end 44a2 of the wire 44a (as shown in FIG. 22 and FIG. 23). As shown in FIG. 7, FIG. 8, and FIG. 28, in another embodiment, a first electrical connector 49 is coupled to the second connecting portion 412 of the extension object 41 or the second end 442 of the conductor 44, and a second electrical connector 50 is coupled to the power storage device 43. By coupling the first electrical connector 49 and the second electrical connector 50, the electric power in the power storage device 43 could be transmitted to the extension object 41 or the conductor 44. In the current embodiment, the power storage device 43 is accommodated in the extension object 41 at a position near the second connecting portion 412. Furthermore, in the case illustrated in FIG. 9 and FIG. 10, the power storage device 43, though not visible in the drawings, is accommodated in a case 20, wherein the case 20 is connected to the second connecting portion 412 of the extension object 41 in a pivotable manner, whereby the extension object 41 could be pivoted relative to the case 20 and folded downward.

In an embodiment, the first electrical connector 49 and the second electrical connector 50 can be a pin and a pin socket which match each other and are located at corresponding positions, whereby the coupling between these two components could be done by plugging the pin into the pin socket. In another embodiment, the first electrical connector and the second electrical connector can be a plug and a socket which match each other and are located at corresponding positions, and the coupling between these two components could be done by, apparently, inserting the plug into the socket. In yet another embodiment, the first electrical connector and the second electrical connector can be conductive pads which are located at corresponding locations, which could be coupled together by contacting the corresponding conductive pads to each other. Each way of coupling could be implemented in a separable or inseparable manner, and therefore the power storage device 43 and the second connecting portion 412 (or the second end 442 of the conductor 44) would be able or not able to be separated from each other correspondingly.

Figure 11:
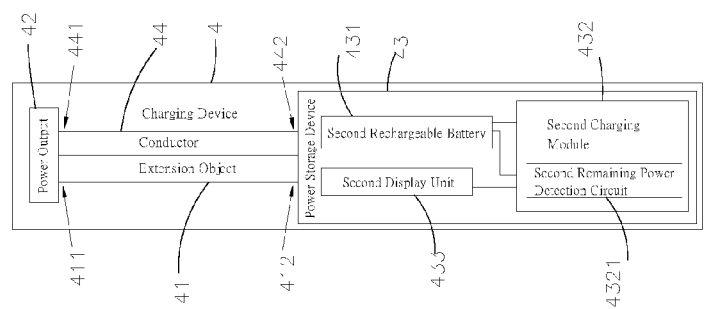
FIG. 11 is a block diagram showing the implementation of the power storage device of the present invention for remaining power detection.

As shown in FIG. 11, in an embodiment, the power storage device 43 at least includes a second rechargeable battery 431, second charging module 432, or further includes a second discharging control circuit, a second charging control circuit, a second protection control circuit, and a second switching circuit, wherein the conditions which are preventable by the second protection control circuit include, but not limited to, overcharge, overvoltage, over discharge, overload, overheat, and short circuit. The second switching circuit is not shown in the drawings, for it is a well-known technique related to charging modules, and therefore we are not going to describe it in details herein. With such design, when the power storage device 43 is coupled to mains electricity, as shown in FIG. 28, the mains electricity could be used to charge the power storage device 43, and to control the charging procedure.

Figure 40:
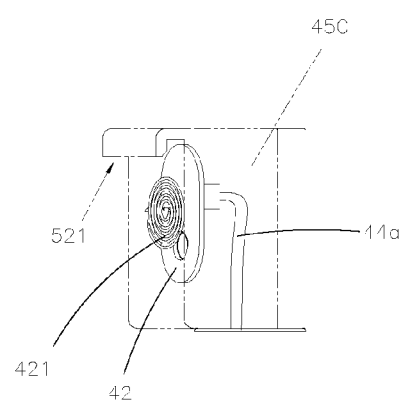
FIG. 40 is a perspective view of the engaging portion of the sixth embodiment of the present invention.
Figure 41A:
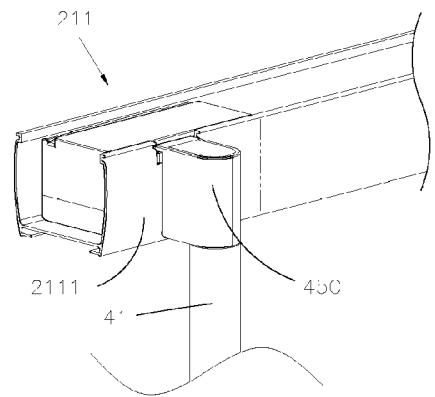
FIG. 41A is a schematic view of the use situation of the sixth embodiment of the present invention.
Figure 41B:
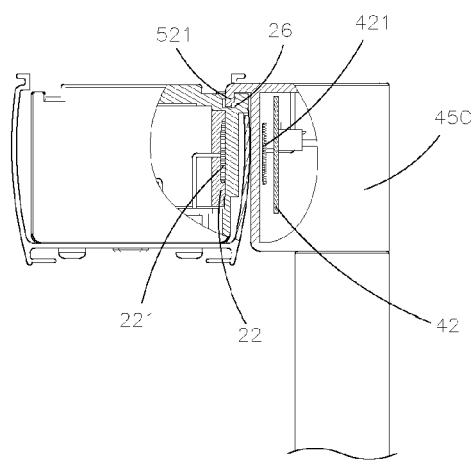
FIG. 41B is a sectional schematic view of FIG. 41A, showing the engagements between the fitting end and the fitting slot, and between the electric power output and the electric power input.

As shown in FIG. 1, in the current embodiment, the electric power output 42 is coupled to the first connecting portion 411 of the extension object 41 or the first end 441 of the conductor 44 located at the position corresponding to the first connecting portion 411. In an embodiment, the electric power output 42 includes at least one of the following components: a pin, a pin socket, a connector, a plug, a socket, and a conductive pad, etc., wherein said at least one components included in the electric power output 42 matches the electric power input 22 provided in the frame 211, and is located at a corresponding position. When the electric power input 22 and the electric power output 42 are connected by engaging the matching and corresponding components, such as inserting the pin into the pin socket, correspondingly engaging the connectors, plugging the plug into the socket, or contacting the conductive pads, the electric power of the electric power output 42 could be transmitted to the electric power input 22, and then to the first charging module 232 coupled to the electric power input 22, whereby to charge the first rechargeable battery 231 of the power supply device 23. In the aforementioned embodiment, the charging device could further include a second terminal block 46, which could be fixed at the extension object 41, or integrally extended from the extension object 41, wherein the electric power output 42 is fixedly provided at the second terminal block 46 (as shown in FIG. 21, and FIG. 28). In another embodiment, the electric power output 42 could include a transmitter coil module 421, which could convert the electric power transmitted to the electric power output 42 into electromagnetic signals and sent them out, as shown in FIG. 40. The electric power input 22 includes a receiver coil module 221 (as shown in FIG. 39), wherein the electromagnetic signals sent out by the transmitter coil module 421 could induce an electric power in the receiver coil module 221 of the electric power input 22, and the induced electric power could be transmitted to the first charging module 232, so as to charge the first rechargeable battery 231.

In the embodiments of the present invention, the charging system could further include a first fixing structure and a second fixing structure, wherein the first fixing structure is connected to the extension object 41 of the charging device 4 and is near the first connecting portion 411, and the second fixing structure is fixed to the frame 211, corresponding to the first fixing structure. The first fixing structure and the second fixing structure are optionally combinable, and when the first and the second fixing structures are combined, the charging device 4 could be firmly connected to the frame and hang therefrom, providing electric power to the electric power input 22 from the electric power output 42, whereby to charge the first rechargeable battery 231 of the power supply device 23. By combining the first fixing structure and the second fixing structure, the charging device 4 could hang from the frame 211, and would not need to be held by hand or by any kind of supporters during the charging procedure. When the charging is completed, the first fixing structure and the second fixing structure could be easily separated, so as to separate the charging device 4 from the frame 211. At this time, the electric power output 42 stops providing power to the electric power input 22, and the charging operation is completed.

Figure 42:
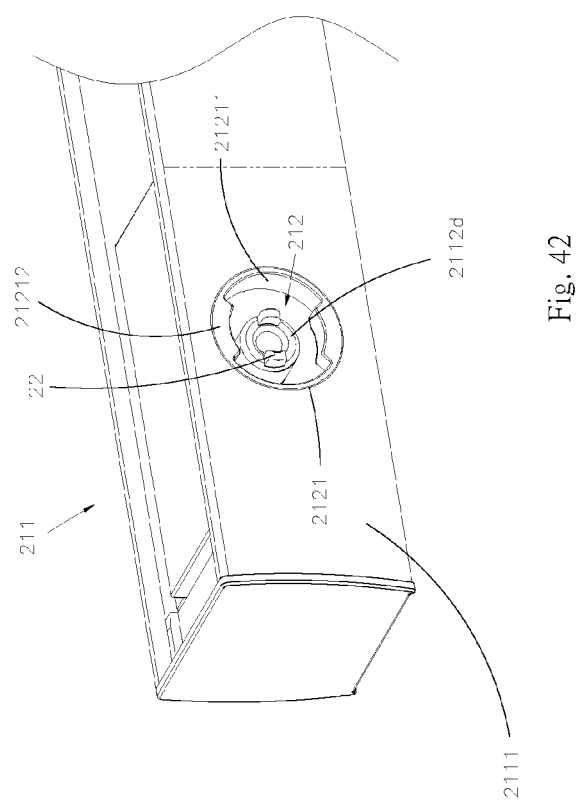
FIG. 42 is a perspective view of the frame applied with a seventh embodiment of the present invention.
Figure 45A:
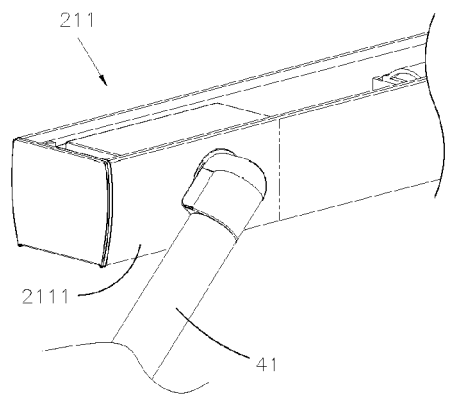
FIG. 45A is a schematic view showing one use situation of the seventh embodiment of the present invention.
Figure 45B:
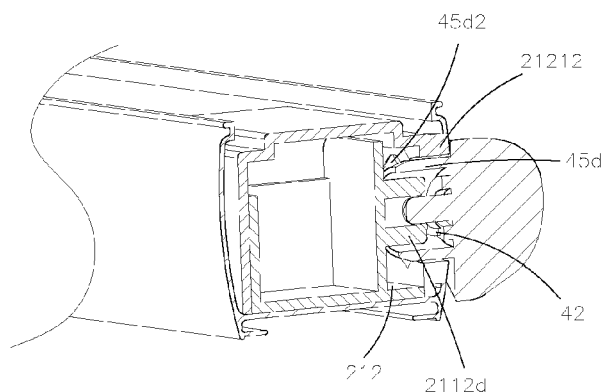
FIG. 45B is a sectional schematic view of FIG. 45A, showing the engaging portion is placed into the notch.
Figure 46A:
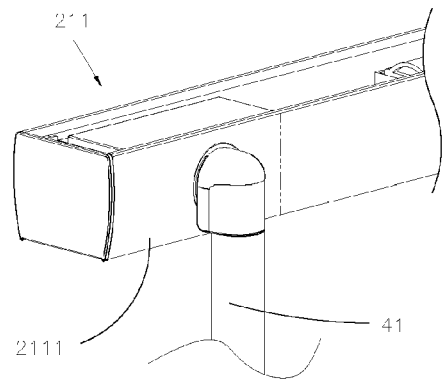
FIG. 46A is a schematic view showing another use situation of the seventh embodiment of the present invention.
Figure 46B:
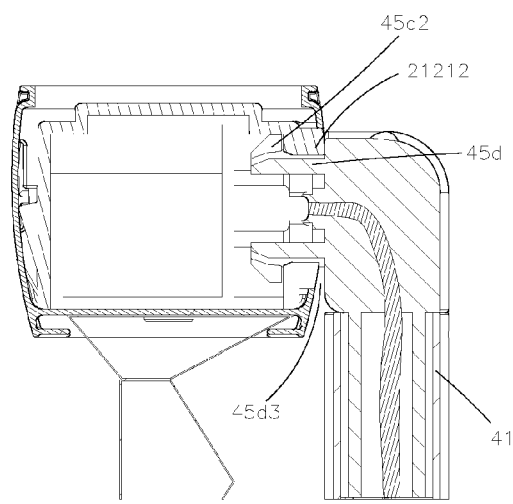
FIG. 46B is a sectional schematic view of FIG. 46A, showing the engaging portion is fitted into the notch.

In an embodiment, the first fixing structure includes an engaging portion 45, wherein the engaging portion 45 is connected to the first connecting portion 411 of the extension object 41, and is substantially perpendicular to the longitudinal direction of the extension object 41, so that the extension object 41 and the engaging portion 45 substantially forma reversed "L" shape. The electric power output 42 is fixed at the engaging portion 45 (as shown in FIGS. 21, 28, 31 and 43). The electric power input 22 is fixedly provided on the frame 211, wherein the frame 211 further has an outer plate 2111. The second fixing structure includes a notch 212, wherein the notch 212 is provided on the frame 211, and is recessed into the frame 211. Furthermore, the notch 212 has an opening 2121 formed on the outer plate 2111. The positions of the notch 212 and the electric power input 22 correspond to each other, as shown in FIGS. 19, 26, and 42. To start the charging operation, a user could hold an end of the extension object 41 to move the extension object 41 toward the frame 211, and eventually, fit the engaging portion 45 into the notch 212 through the opening 2121. In this way, the extension object 41 does not need to be held manually during the charging procedure, and the extension object 41 could remain connected to the frame 211, so that the charging device 4 would hang from the frame 211. At the same time, the electric power output 42 would contact the electric power input 22, so that the electric power output 42 could transmit electric power to the electric power input 22 to perform the charging operation. To finish the charging operation, a user could move the extension object 41 to make the engaging portion 45 move out of the opening 2121 and get disengaged from the notch 212. As a result, the extension object 41 would be separated from the frame 211, interrupting the contact between the electric power output 42 and the electric power input 22, whereby to stop providing electric power to the electric power input 22.

Figure 12:
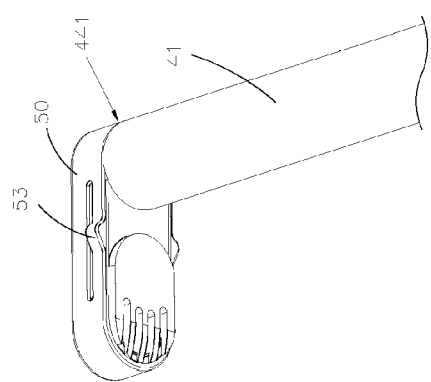
FIG. 12 is a schematic view showing the charging device of the present invention has the elastic plate.
Figure 25:
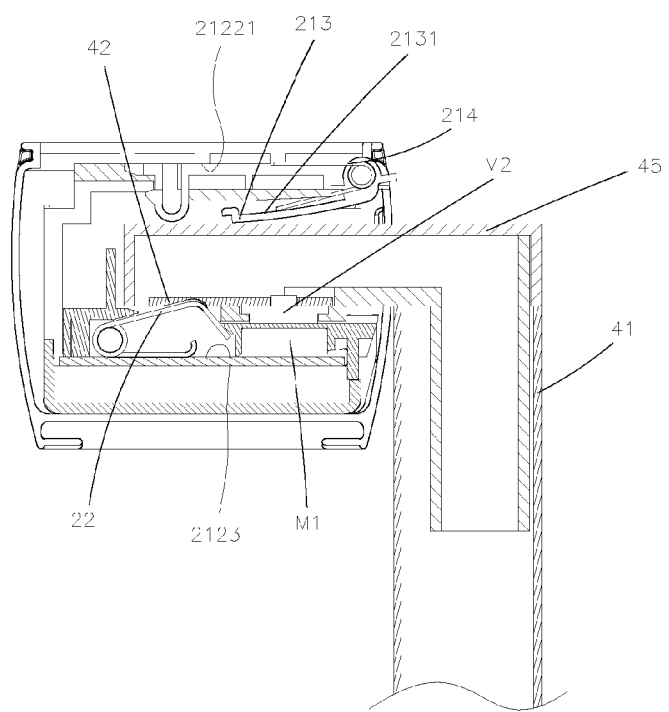
FIG. 25 is a side sectional schematic view of FIG. 24.
Figures 29, 31:
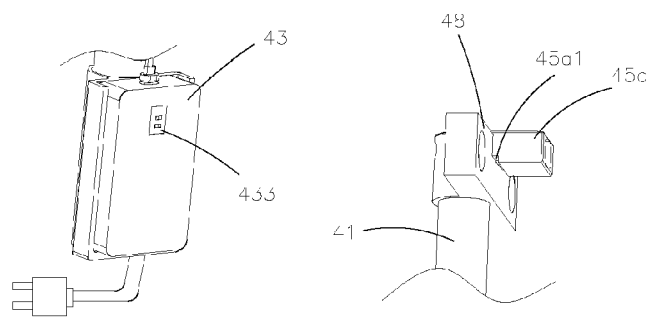
FIG. 29 is a perspective view of the power storage device in the second embodiment of the present invention.
FIG. 31 is a perspective view of the engaging portion of a third embodiment of the present invention.

As shown in FIG. 21 and FIG. 25, in another embodiment, the engaging portion 45 could be provided with a first magnetic member M1, and the notch 212 could have a second magnetic member M2 provided at a location corresponding to the first magnetic member M1. When the engaging portion 45 is fitted in the notch 212, the extension object 41 could remain connected to the frame 211 more firmly due to the mutual attraction between the first magnetic member M1 and the second magnetic member M2. As shown in FIG. 26 and FIG. 31, in another embodiment, the engaging portion 45a could have a groove 45a1 provided on a bottom surface thereof, while the notch 212 could have a flange 2125 formed at a location corresponding to the groove 45a1. By fitting the groove 45a1 and the flange 2125, the extension object 41 could remain connected to the frame 211 more firmly when the engaging portion 45a is fitted in the notch 212. In addition, as shown in FIG. 12 and FIG. 19, in yet another embodiment, an elastic plate 53 could be provided on the engaging portion 45 in a manner that the elastic plate 53 protrudes from an outer surface of the engaging portion 45. An outline of the elastic plate 53 is larger than a width of the opening 2121 of the notch 212 when the elastic plate 53 is in an unconstrained state, so that when the elastic plate 53 passes through the opening 2121, the elastic plate 53 would be compressed by a margin of the opening 2121 or by a wall of the notch 212, and therefore would get fixed by the margin of the opening 2121 or the wall of the notch 212. Alternatively, when the opening 2121 is smaller than the notch 212, the engaging portion 45 could go into the notch 212, wherein the elastic plate 53 would be compressed by the opening 2121 first, and then would return to its unconstrained state after passing through the opening 2121. In this way, the elastic plate 53 would push against a surface of a periphery of the opening 2121 which faces the notch. In this way, the extension object 41 of the charging device 4 could remain connected to the frame 211. When an appropriate external force is applied to move the extension object 41 in a direction away from the frame 211, the elastic plate 53 could get disengaged after passing through the opening 2121, whereby to separate the extension object 41 from the frame 211. In the current embodiment, the elastic plate 53 could be further connected to a control member (not shown). By using the control member to squeeze the elastic plate 53 inward, the engaging portion 45 could enter the notch 212 through the opening 2121 more easily. Once the control member is pulled back, the elastic plate 53 would bulge outward to return to the unconstrained state, pushing against the opening 2121 or the notch 212. In the aforementioned structures, the elastic plate 53 could also be provided in the notch 212 or around the opening 2121 to fix the engaging portion 45. The operation principle is the same as explained above, so we are not going to describe in details again herein.

Herein we provided another embodiment of the engaging portion 45d, which is, the same as the engaging portion 45 mentioned in the previous embodiment, connected to the extension object 41 at a position near the first connecting portion 411, and the frame 211 is correspondingly provided with the notch 212 as well. As shown in FIG. 42 and FIG. 43, the engaging portion 45d has an open end surface 45d1, and the electric power output 42 is fixedly provided at the open end surface 45d1. In addition, the engaging portion 45d has a block member 45d2, which is formed in a radial direction of the engaging portion 45d, and protrudes from an outer surface of the engaging portion 45d. The outline of the opening 2121 of the notch 212 matches the outline of the engaging portion 45d. The opening 2121 further has an inner wall 21211 and a stop member 21212, wherein the stop member 21212 is formed from the inner wall 21211 of the opening 2121 toward a center of the opening 2121 in a radial direction of the opening 2121. When the block member 45d2 and the stop member 21212 are staggered, the engaging portion 45d could be placed into the frame 211 through the opening 2121. After that, the extension object 41 could be further rotated until the block member 45d2 and the stop member 21212 at least partially overlap each other in an axial direction of the opening 2121. At this time, the block member 45d2 would be blocked by the stop member 21212, so that the engaging portion 45d would be fixed in the frame 211. In this way, the electric power output 42 fixedly provided on the engaging portion 45d could contact the electric power input 22 fixedly provided at the frame 211.

Figure 30:
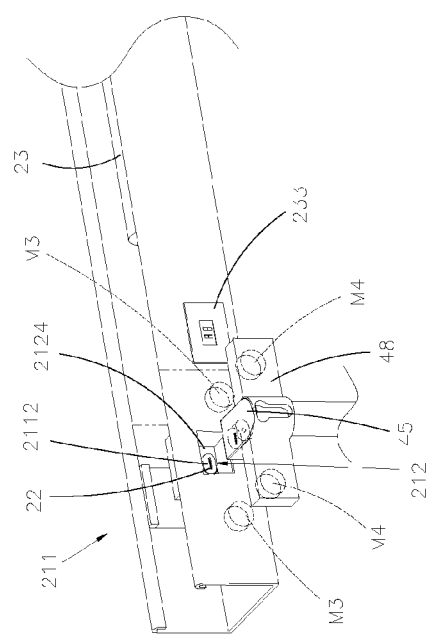
FIG. 30 is a schematic view showing the use situation of the second embodiment of the present invention.

In an embodiment shown in FIG. 28 and FIG. 30 which has the first fixing structure and the second fixing structure, the charging device 4 further includes a holder 48, wherein the holder 48 is connected to the first connecting portion 411 of the extension object 41. The electric power output 42 could be directly fixed to the holder 48, or indirectly fixed to the holder 48 through the second terminal block 46 or other connecting members which could be used to fix the electric power output 42 or the second terminal block 46. The first fixing structure includes a third magnetic member M3 fixedly provided at the holder 48, while the second fixing structure includes a fourth magnetic member M4 fixedly provided at the frame 211. When the holder 48 approaches the frame 211, the third magnetic member M3 and the fourth magnetic member M4 would stick together, so that the extension object 41 of the charging device 4 would remain connected to the frame 211, and the electric power output 42 and the electric power input 22 would remain at corresponding positions or electrically connected together. Whereby, electric power could be provided to the electric power input 22 from the electric power output 42. By driving the third magnetic member M3 to leave the fourth magnetic member M4, the extension object 41 of the charging device 4 could be disengaged from the frame 211. In another embodiment, the third magnetic member M3 and the fourth magnetic member M4 could be not permanent magnets; wherein, when one of them is passed through by an electric current, it would create a magnetic force to attract the other one. For example, if the third magnetic member M3 is an electromagnet, the third magnetic member M3 could be coupled with the first connecting portion 411 of the extension object 41 or the first end 441 of the conductor 44, so that when the power storage device 43 transmits electric power to the electric power output 42 through the extension object 41 or the conductor 44, it would also provide an electric current to the electromagnet, whereby to create a magnetic force to attract the fourth magnetic member M4. In this way, the extension object 41 could remain connected to the frame 211. Once the power storage device 43 stops to transmit electric power to the electric power output 42, the electric current provided to the electromagnet would be stopped at the same time, which would make the magnetic force of the electromagnet disappear. As a result, the third magnetic member M3 could be separated from the fourth magnetic member M4, and therefore so could the extension object 41 and the frame 211.

Figure 35:
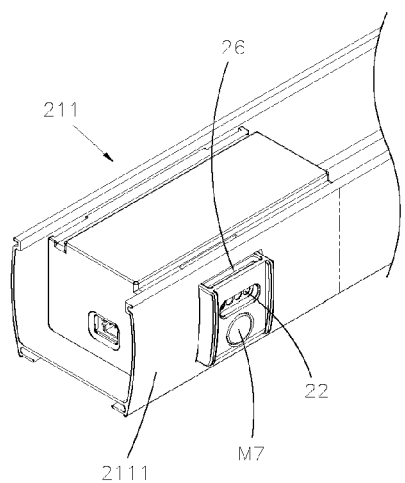
FIG. 35 is a perspective view showing the frame applied with a fifth embodiment of the present invention.
Figure 36:
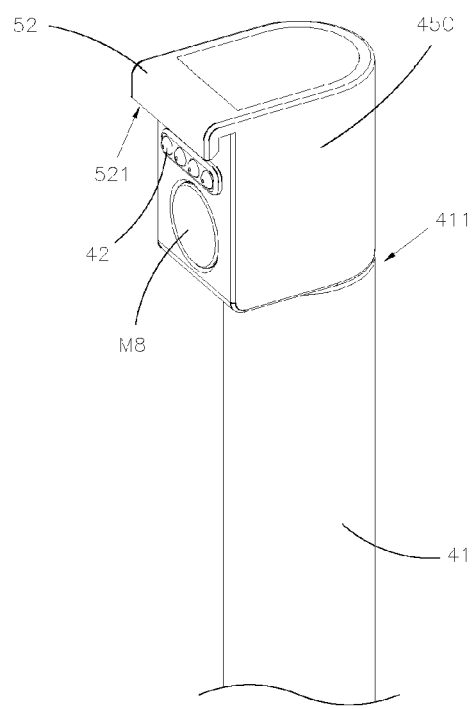
FIG. 36 is a perspective view of the charging system of the fifth embodiment of the present invention.

In addition, in an embodiment shown in FIG. 35 and FIG. 36 which has the first fixing structure and the second fixing structure, the first fixing structure includes a fitting portion 52, wherein an end of the fitting portion 52 is connected to the extension object 41 and is near the first connecting portion 411; another end of the fitting portion 52 is a fitting end 521. The second fixing structure includes a fitting slot 26, which is fixed on the frame 211. Preferably, the fitting slot 26 could be provided on the outer plate 2111 of the frame 11. When the fitting end 521 is fitted into the fitting slot 26 to keep the extension object 41 connected to the frame 211, the electric power output 42 and the electric power input 22 would remain at corresponding locations or contact each other, whereby the electric power output 42 could provide electric power to the electric power input 22.

The implementations of the first fixing structure and the second fixing structure in each aforementioned embodiment are not limitations of the present invention. The first and the second fixing structures could be implemented in ways opposite to those described above, or there could be, optionally, more than one type of the aforementioned first fixing structures and more than one type of the aforementioned second fixing structures working together. Furthermore, the first fixing structure and the second fixing structure could be optionally locked or unlocked relative to the frame and the extension object, whereby to provide a firmer engagement between the extension object and the frame.

As shown in FIG. 2 and FIG. 26, in the embodiments of the present invention, the power supply device 23 could further include a first display unit 233. In the current embodiment, the first display unit 233 is presented as being provided on the first seat 215 or the integrally formed housing 21, and the first display unit 233 is coupled to the first remaining power detection circuit 2321 of the first charging module 232. The first display unit 233 could be a LED or a digital display, so that the first display unit 233 could be used to display the output signals of the first remaining power detection circuit 2321, whereby a user could easily check the current remaining power of the first rechargeable battery 231, or check the charging progress of the rechargeable battery 231 during the charging procedure.

Figure 13:
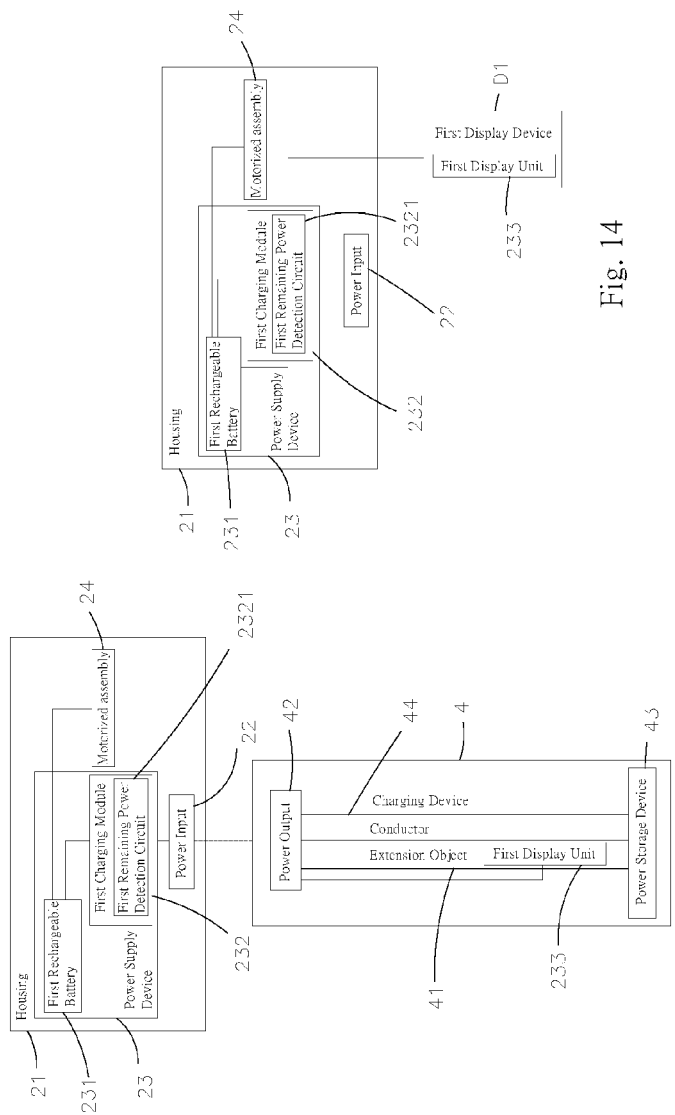
FIG. 13 is a block diagram showing another implementation of the first display unit of the present invention.

As shown in FIG. 13, in another embodiment, the first display unit 233 could be provided on the extension object 41 or the power storage device 43. The first display unit 233 is connected to the first remaining power detection circuit 2321 of the first charging module 232, wherein the connection could be established through the coupling between connectors, whereby the output signals of the first remaining power detection circuit 2321 could be transmitted to the first display unit 233. Or, the first display unit 233 can be coupled to the electric power output 42 while the first remaining power detection circuit 2321 is coupled to the electric power input 22, whereby to transmit the output signals of the first remaining power detection circuit 2321 to the electric power input 22, and then to transmit the output signals to the first display unit 233 through the coupling between the electric power input 22 and the electric power output 42. In this way, the current status of remaining power of the first rechargeable battery 231 could be displayed. In the current embodiment, the first display unit 233 and the first remaining power detection circuit 2321 of the first charging module 232 could be wirelessly connected. In other words, the first remaining power detection circuit 2321 is coupled to a transmitter to send out the output signals, and the first display unit 233 is coupled to a receiver to receive the output signals. Then the received output signals could be converted into LED signals or digital display signals to be displayed on the first display unit 233 provided at the extension object 41 or the power storage device 43.

Figure 14:
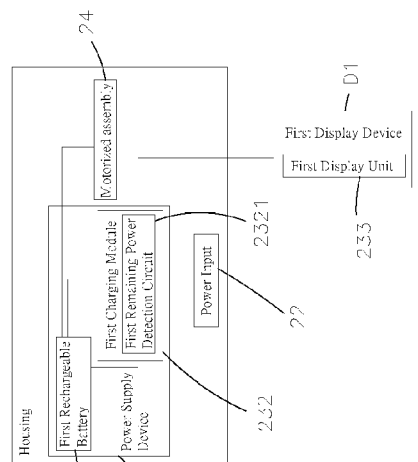
FIG. 14 is a block diagram showing yet another implementation of the first display unit of the present invention.

As shown in FIG. 14, in yet another embodiment, the first display unit 233 can be fixed on a first display device D1, and the first display device D1 can be provided at a location other than the frame 211, the housing 21, and the charging device 4, such as being located on a wall, on a remote control, or on another portable device such as a cellphone, so that a user could easily check all kinds of power status of the first rechargeable battery 231. The first display unit 233 could be coupled to or wirelessly connected to the first remaining power detection circuit 2321 of the first charging module 232 to transmit signals, whereby to display the current remaining power of the first rechargeable battery 231.

Figure 51:
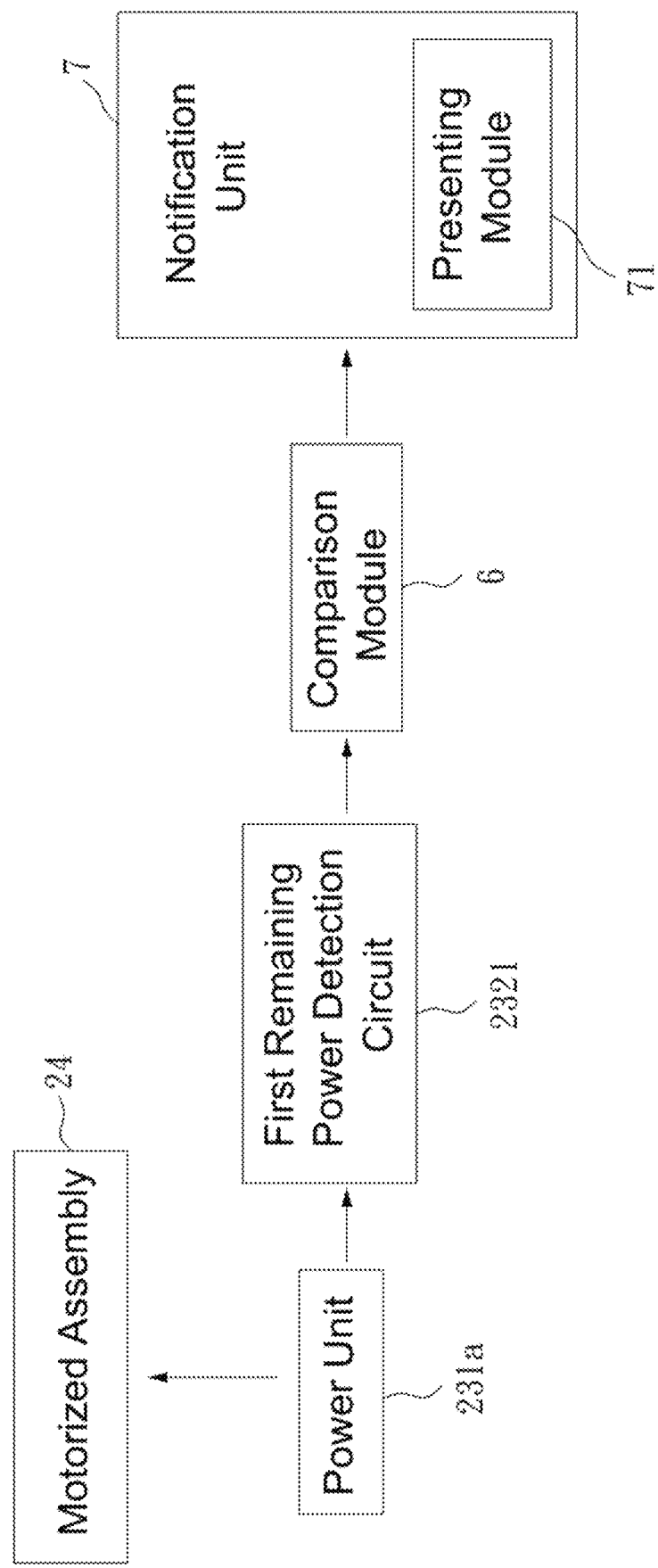
FIG. 51 is a block diagram showing the system provided in the present invention which notifies a user regarding a low potential magnitude of the power unit.

Furthermore, the embodiment of the present invention could also actively remind the user to charge the power unit 231a when the potential magnitude of the power unit 231a lowers to some predetermined value. The system block diagram of such implementation is shown in FIG. 51, wherein the first remaining power detection circuit 2321 is coupled to the power unit 231a to detect the current potential magnitude of the power unit 231a. The first remaining power detection circuit 2321 generates and outputs a potential signal. The charging system could further include a comparison module 6 and a notification unit 7, wherein the notification unit 7 includes a presenting module 71. The comparison module 6 is coupled to the first remaining power detection circuit 2321, while the notification unit 7 is coupled to the comparison module 6. The potential signal outputted by the first remaining power detection circuit 2321 is inputted to the comparison module 6 to be compared with a threshold predetermined in the comparison module 6. When the potential magnitude presented by the potential signal is less than the threshold, the comparison module 6 generates and outputs a warning notice signal, which is then transmitted to the presenting module 71 of the notification unit 7, so that the presenting module 71 could present at least one kind of warning notice which represents the warning notice signal. Whereby, only when the potential magnitude of the power unit 231a which supplies power to the motorized assembly 24 is lowered to be less than the predetermined threshold will the charging system actively send out the warning notice signal, which is subsequently presented by the presenting module 71. By presenting at least one kind of warning notice to inform the user to charge the power unit 231a, it would be convenient for the user to get the information. If the potential magnitude of the power unit 231a is greater than the threshold, it means that the capacity of the power unit 231a is still sufficient for supplying power to and driving the motorized assembly 24, and, in such condition, the comparison module 6 does not output any warning notice signal to the presenting module 71, whereby the power consumption of the power unit 231a could be reduced. As a result, the power unit 231a could hold its potential magnitude higher than the threshold for a longer time.

In the current embodiment, the presenting module 71 includes a visual notification generating component, e.g., a display component, so that the display component could, upon receiving the warning notice signal, be driven to display the warning notice representing the warning notice signal in forms such as text notification, icon notification, or image notification.

In the current embodiment, the presenting module 71 includes an audio notification generating component, e.g., an sound outputting component, including a buzzer, a speaker, or similar components, so that the buzzer or the speaker could, upon receiving the warning notice signal, be driven to make the warning notice representing the warning notice signal in forms such as text-to-speech, siren, or a piece of predetermined music.

In the current embodiment, the presenting module 71 includes a tactile notification generating component, e.g., a vibrating component, so that the vibrating component could, upon receiving the warning notice signal, be driven to make vibrations representing the warning notice signal, whereby to inform the user.

In the current embodiment, the first remaining power detection circuit 2321 could determine the current total potential magnitude of the power unit 231a in ways regarding voltage difference or current level.

In the current embodiment, the threshold for the comparison of the potential magnitude predetermined in the comparison module 6 is 30% of the total potential magnitude of the power unit 231a when it is fully charged. However, the percentage mentioned here is not a limitation of the present invention; the threshold could be adjusted according to the potential magnitude required for driving different motorized assemblies 24.

In the current embodiment, the presenting module 71 is controllable to periodically present the warning notice until the comparison module 6 no longer outputs the warning notice signal.

Figure 52:
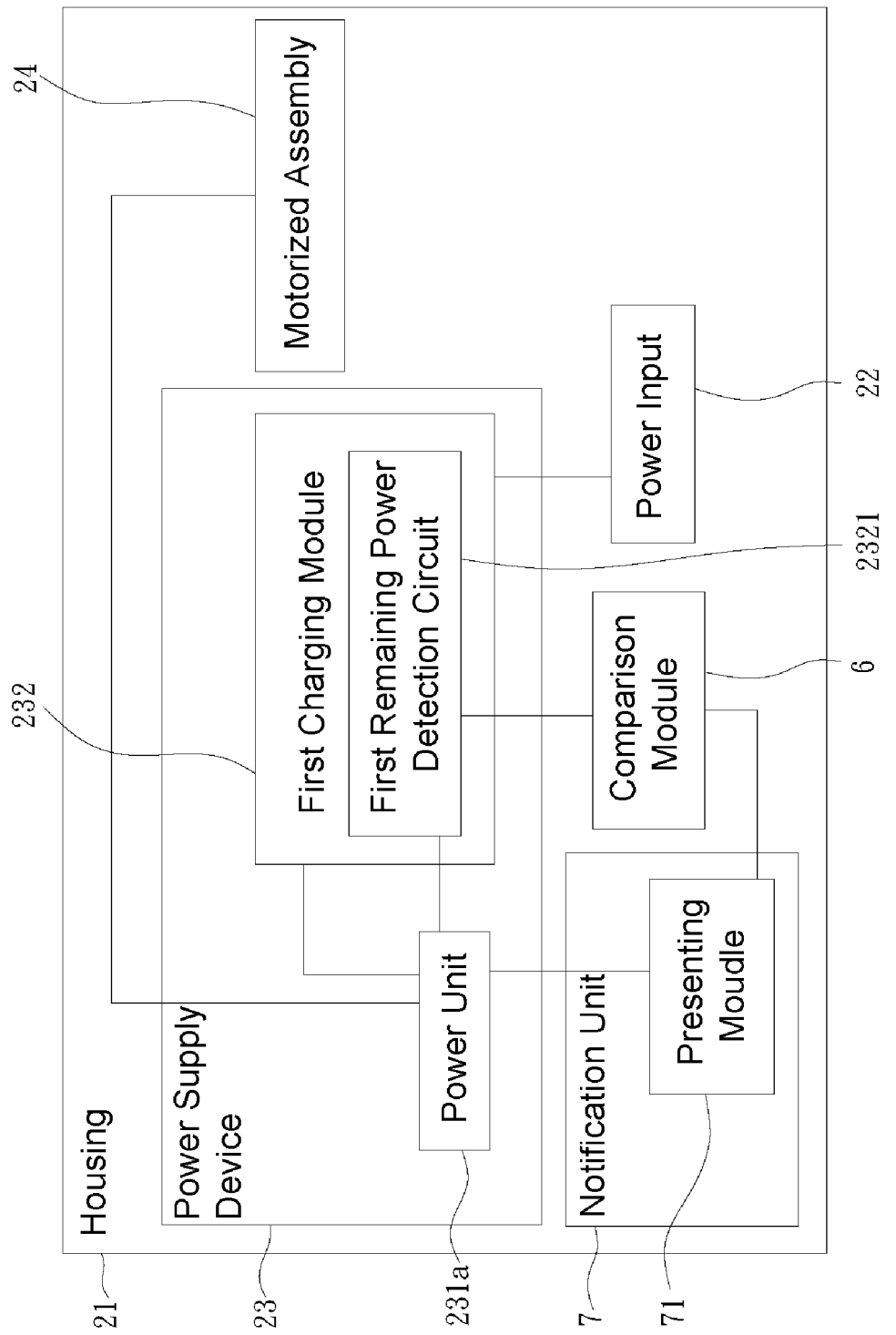
FIG. 52 is a system block diagram showing the arrangement of the notification unit of the present invention when it is provided in the housing.

In the embodiment shown in FIG. 52, the comparison module 6 and the presenting module 71 of the notification unit 7 are disposed at the housing 21, and the presenting module 71 is coupled to the power unit 231a, so that the power unit 231a could supply the power required when the presenting module 71 is driven. The first remaining power detection circuit 2321 of the power supply device 23 detects the potential magnitude of the power unit 231a, and accordingly generates and outputs a potential signal to the comparison module 6. When the potential magnitude represented by the potential signal is less than the predetermined threshold, the comparison module 6 generates and outputs a warning notice signal to the presenting module 71. Therefore, the presenting module 71 provided in the housing 21 could present the warning notice representing the warning notice signal, in ways such as emitting light or showing images through a display or an indicator light or making sounds through a buzzer, to notify the user to charge the power unit 231a.

Figure 53:
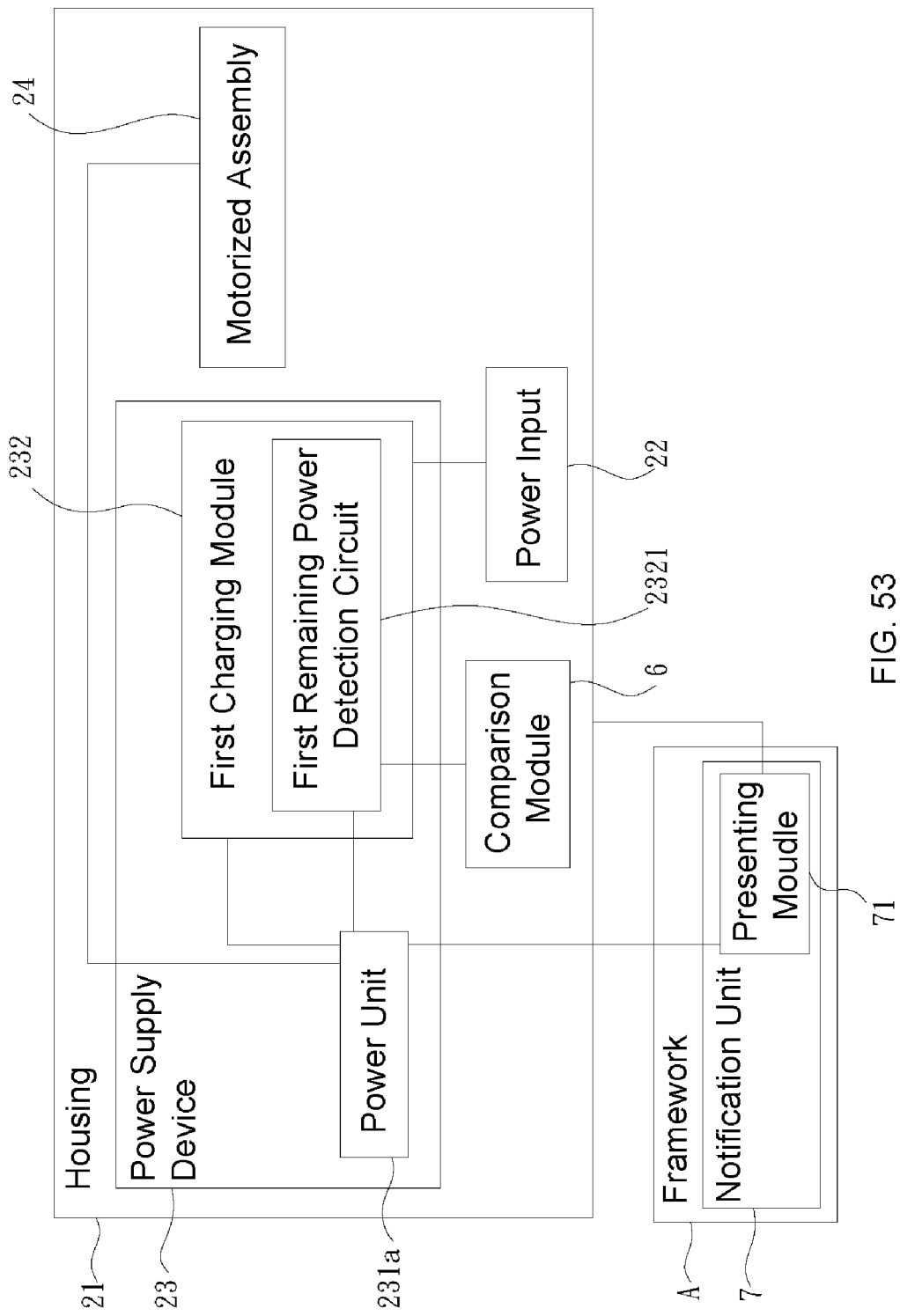
FIG. 53 is a system block diagram showing the arrangement of the notification unit of the present invention when it is provided in a framework independent of the housing.

In the embodiment shown in FIG. 53, the presenting module 71 could be also disposed at a framework A, which is independent of the housing 21, if it is more feasible to notify the user.

Figure 54:
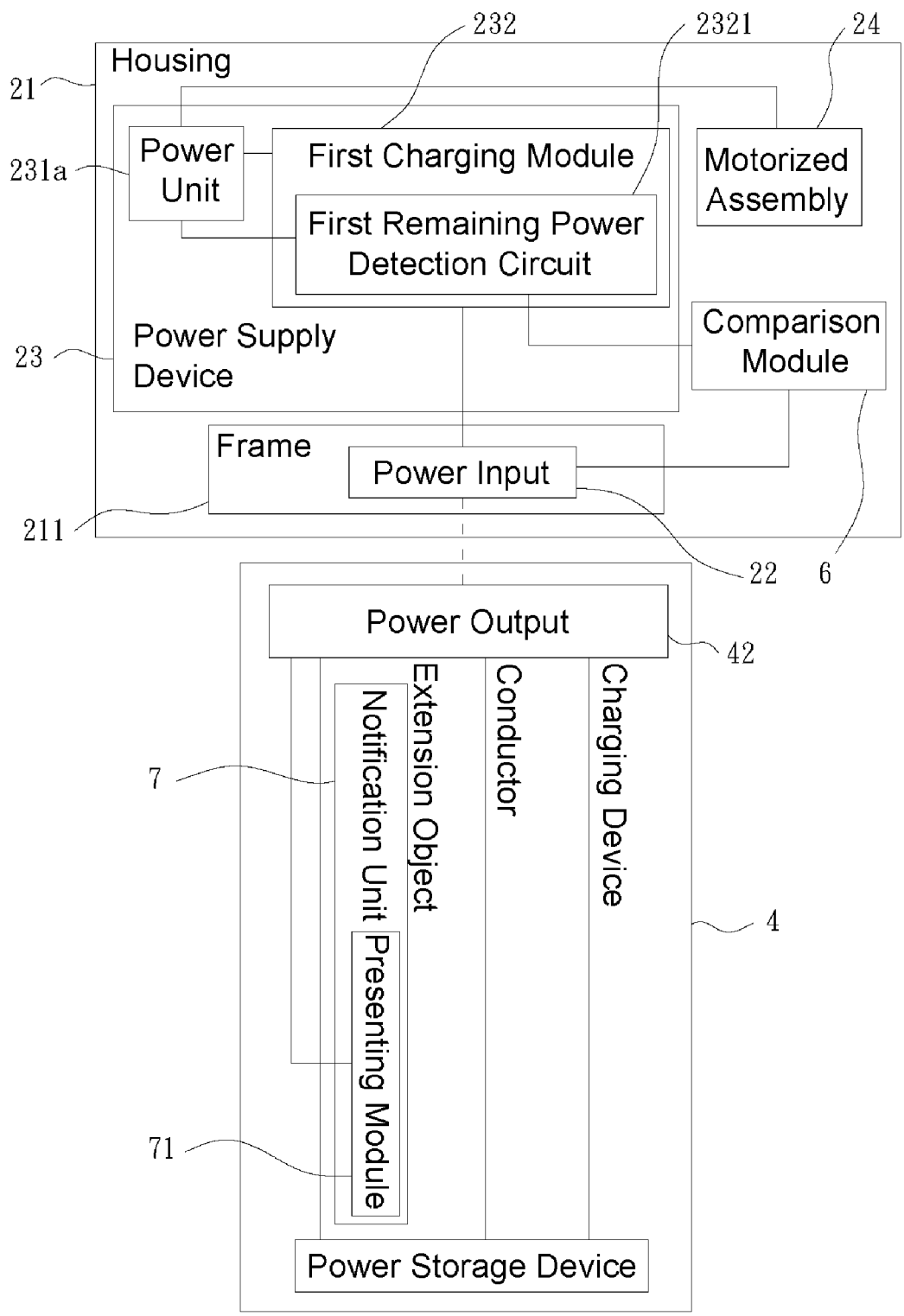
FIG. 54 is a system block diagram showing an arrangement of the notification unit of the present invention when it is provided at the charging device.

In the embodiment shown in FIG. 54, the notification unit 7 is disposed at the charging device 4, and the charging device 4 is connected to a first fixing structure. The frame 211 of the electric window covering 2 fixes the second fixing structure. When the charging device 4 is connected to the frame 211 of the electric window covering 2 by connecting the first fixing structure and the second fixing structure, the presenting module 71 of the notification unit 7 could present the warning notice. The implementations of the first fixing structure and the second fixing structure are basically described in above paragraphs; the implementation for the current embodiment is described below. The comparison module 6 is disposed in the housing 21, and is coupled to the electric power input 22 disposed on the frame 211. The notification unit 7 is disposed at the charging device 4, and the presenting module 71 of the notification unit 7 is coupled to the electric power output 42 of the charging device 4. When the first fixing structure and the second fixing structure are connected, the warning notice signal outputted by the comparison module 6 could be transmitted to the presenting module 71 through the electric power input 22 and the electric power output 42, by which the presenting module 71 disposed at the charging device 4 could present the warning notice representing the warning notice signal to inform the user to charge the power unit 231a.

Figure 55:
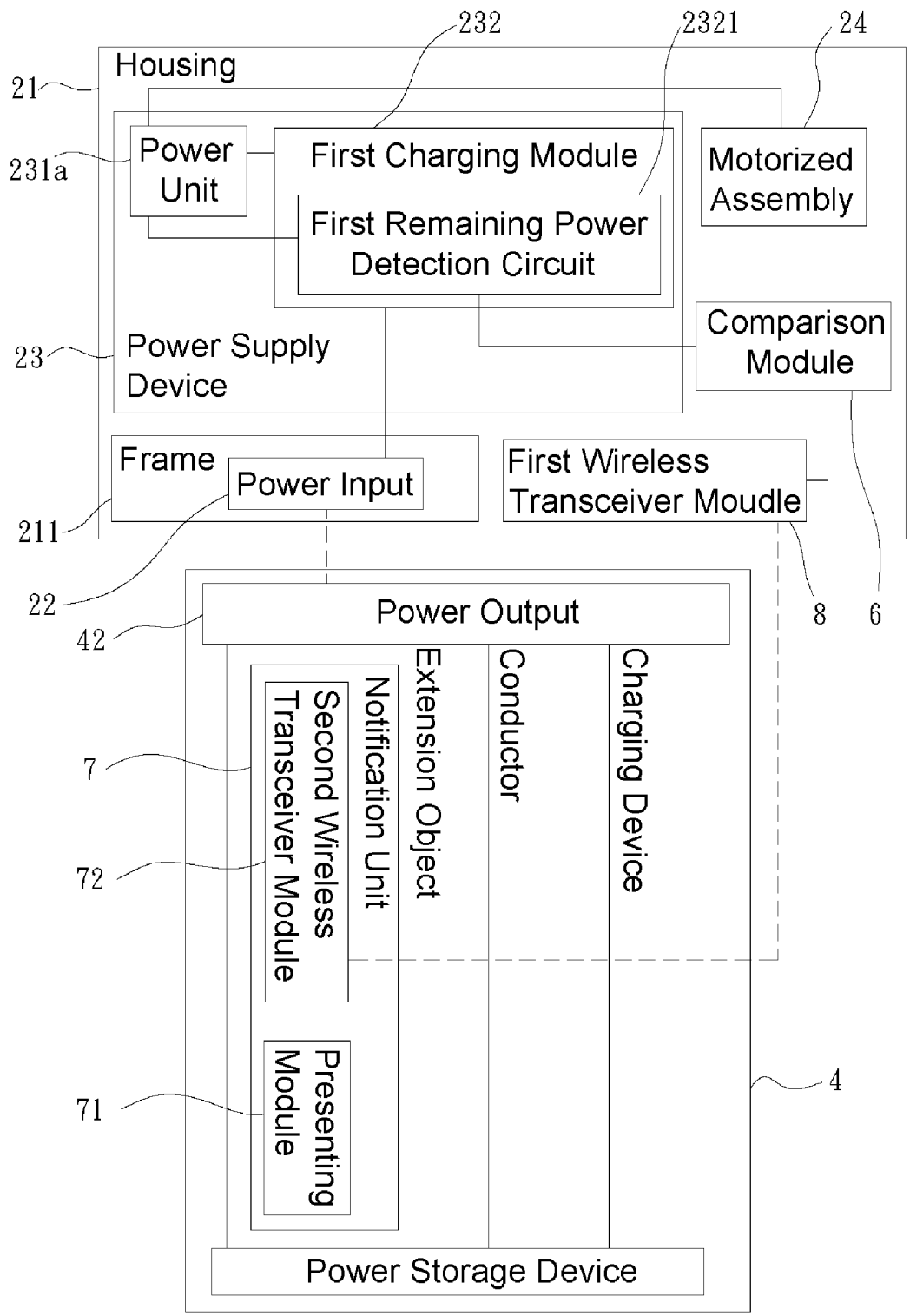
FIG. 55 is a system block diagram showing another arrangement of the notification unit of the present invention when it is provided at the charging device.

In the embodiment shown in FIG. 55, the comparison module 6 and the notification unit 7 disposed at the charging device 4 could transmit the warning notice signal wirelessly, and the implementation is described below. The comparison module 6 is disposed at the housing 21, and is coupled to a first wireless transceiver module 8; the notification unit 7 disposed on the charging device 4 further includes a second wireless transceiver module 72, which is coupled to the presenting module 71. When the comparison module 6 generates and outputs the warning notice signal, the warning notice signal could be transmitted to the presenting module 71 through the wireless transmission between the first wireless transceiver module 8 and the second wireless transceiver module 72, by which the presenting module 71 could present the warning notice. Said warning notice could be vibrations or indicating lights, but this is not a limitation of the present invention. With the warning notice presented by the presenting module 71 on the charging device 4, the user could learn about the fact that the power unit 231a of the electric window covering needs to be charged.

Figure 56:
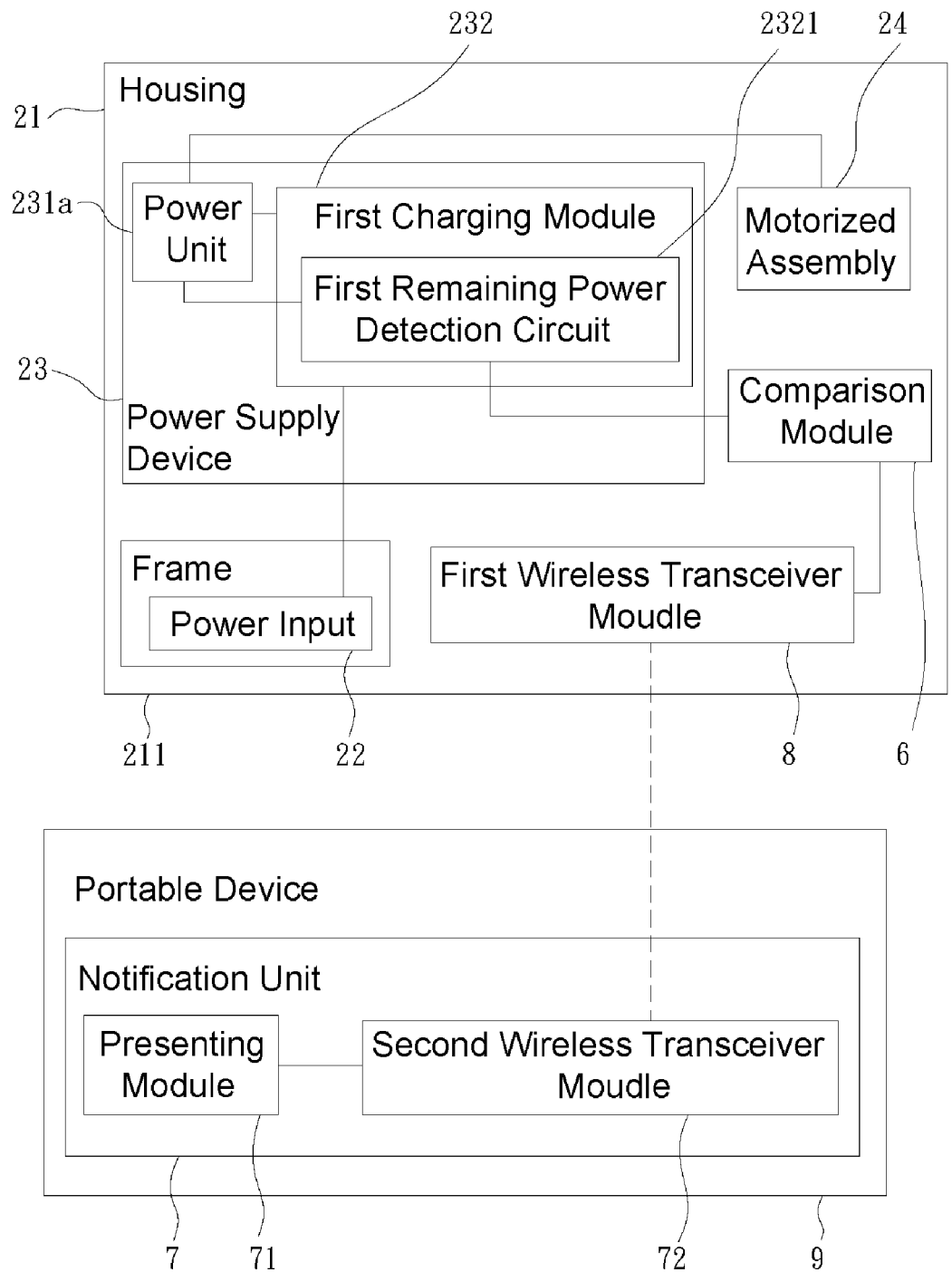
FIG. 56 is a system block diagram showing an arrangement of the notification unit of the present invention when it is provided at a portable device of a user.

In the embodiment shown in FIG. 56, the notification unit 7 is disposed at a portable device 9, e.g., a cellphone or a portable terminal device. The comparison module 6 is disposed in the housing 21, and is coupled to a first wireless transceiver module 8. The presenting module 71 of the notification unit 7 is coupled to a second wireless transceiver module 72. When the potential magnitude represented by the potential signal received by the comparison module 6 is less than the predetermined threshold, the warning notice signal is generated and outputted. Said warning notice signal could be transmitted to the presenting module 71 through the wireless transmission between the first wireless transceiver module 8 and the second wireless transceiver module 72, by which the presenting module 71 could present the warning notice. In the current embodiment, the presenting module 71 and the second wireless transceiver module 72 could be the presenting module and the wireless transceiver module inherently included in the portable device 9. For example, if the portable device 9 is a cellphone, the presenting module 71 could be the display, the speaker, or the vibrating component of the cellphone, and the warning notice could be text messages, images, sounds, or vibrations, which are not limitations of the present invention. Upon receiving the warning notice, the user gets to know that the power unit 231a currently has low capacity, and therefore could charge the power unit 231a of the electric window covering.

Figure 57:
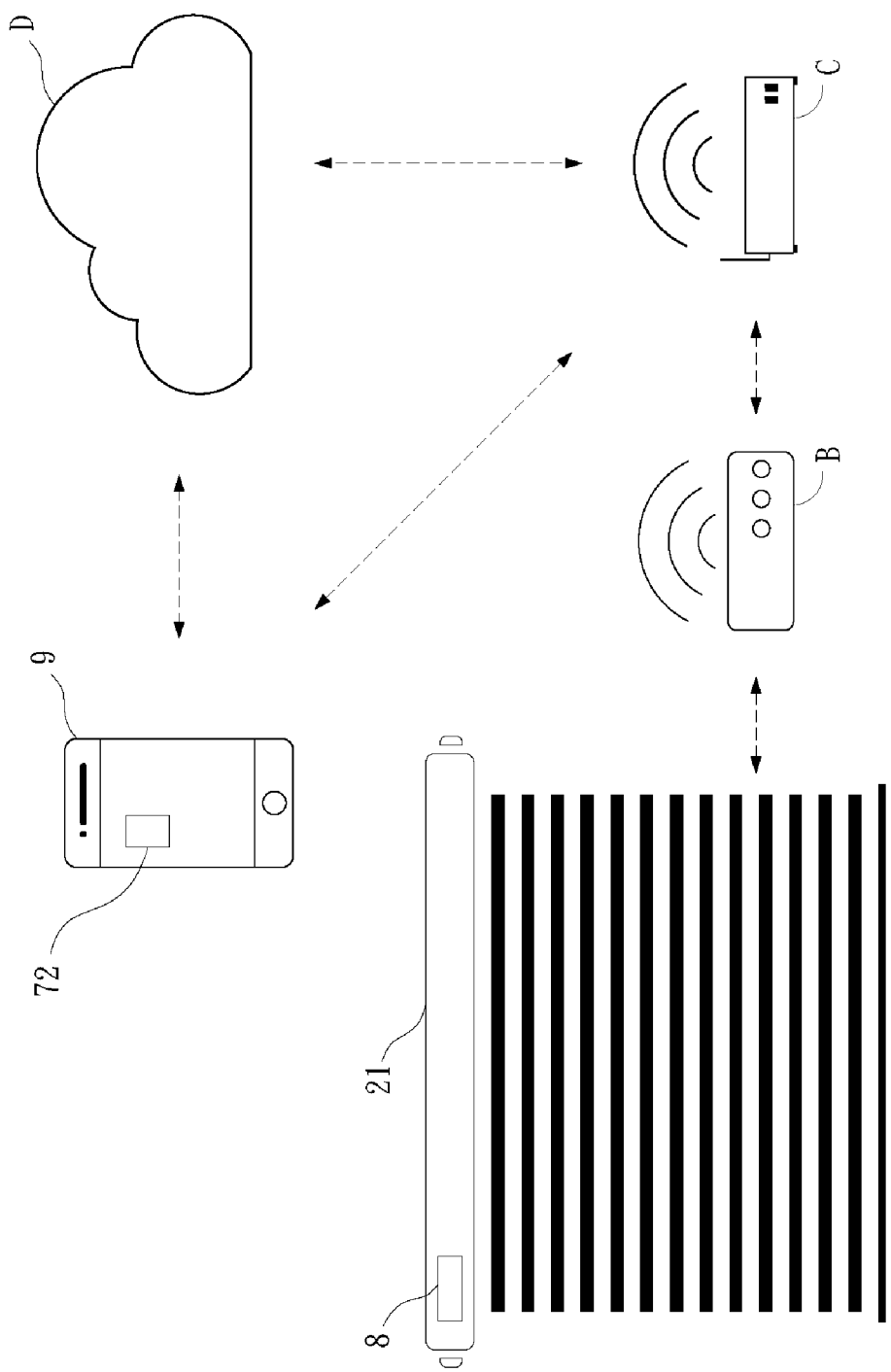
FIG. 57 is a schematic view showing how the first wireless transceiver module and the second wireless transceiver module of the present invention perfume wireless communications through a gateway, a router, and a cloud server.

In the embodiments shown in FIG. 56 and FIG. 57, the first wireless transceiver module 8 coupled to the comparison module 6 could perform wireless transmission with the second wireless transceiver module 72 disposed at the portable device 9 through a gateway B and a router C, or through a gateway B, a router C, and a cloud server D.

Figures 15, 16:
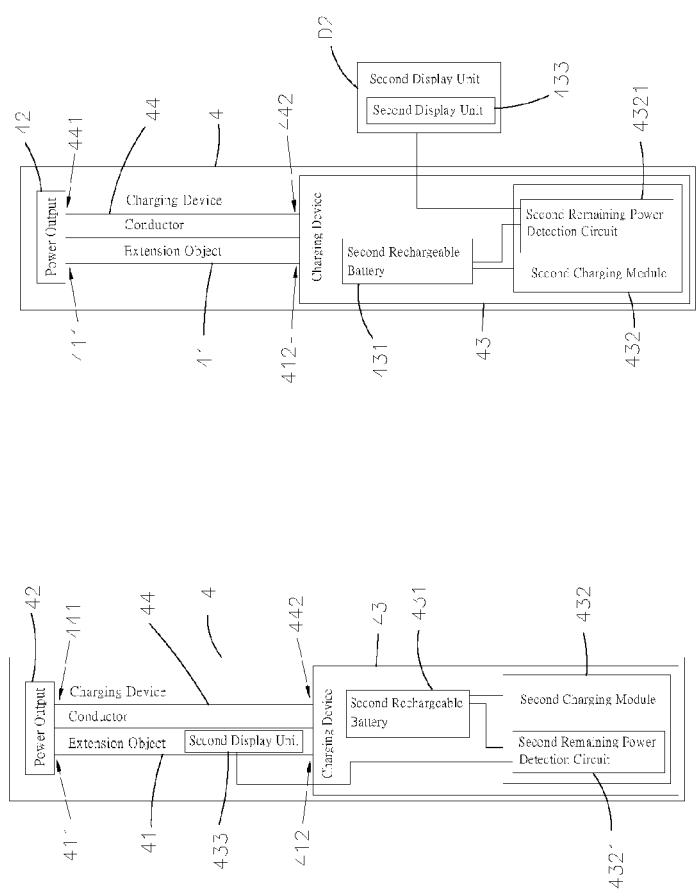
FIG. 15 is a block diagram showing another implementation of the second display unit of the present invention.
FIG. 16 is a block diagram showing yet another implementation of the second display unit of the present invention.

As shown in FIG. 11, FIG. 15, and FIG. 16, in the embodiments of the present invention, the power storage device 43 could further includes a second display unit 433, wherein the second display unit 433 is coupled to the second remaining power detection circuit 4321 of the second charging module 432, whereby the second display unit 433 could display the detected current remaining power of the power storage device 43. Similar to the first display unit 233, the second display unit 433 could be a LED or a digital display. The second display unit 433 could be provided at the power storage device 43 (as shown in FIG. 11 and FIG. 29), at the extension object 41 (as shown in FIG. 15), or at a second display device D2 (as shown in FIG. 16), wherein the signal transmission between the second remaining power detection circuit 4321 and the second display unit 433 could be done through coupling or wireless communication.

As shown in FIG. 11, 15, 16, 24, and FIG. 29, in the embodiments of the present invention, the power storage device can be charged by provided with electric power from an external power source, wherein the external power source is coupled to the second charging module 432, so as to charge the second rechargeable battery 431 of the power storage device 43. In an embodiment, the external power source can be a direct current power source, which is coupled to the second charging module 432 to charge the second rechargeable battery 431 of the power storage device 43. In another embodiment, the external power source can be a power source created by an AC/DC transformer T1, which could also charge the second rechargeable battery 431 of the power storage device 43.

The components described in above embodiments and exemplified implementations can be respectively selected and combined to carry out the present invention. In the following paragraphs, we are going to describe several practical embodiments. However, these embodiments are illustrated to explain the concept of the present invention, and should not be deemed limitations.

An implementation using the charging system of the first embodiment of the present invention to perform the charging operation is illustrated in FIG. 17 to FIG. 25. The electric window covering 2 at least includes a housing 21, an electric power input 22, a power supply device 23, and a motorized assembly 24. Wherein, the housing 21 includes a frame 211 adapted to accommodate an electric power input 22, a first seat 215 adapted to accommodate a power supply device 23, and a second seat 216 adapted to accommodate a motorized assembly 24. The power supply device 23 is respectively coupled to the electric power input 22 and the motorized assembly 24, wherein the power supply device 23 is used to provide the electric power required by the motorized assembly 24.

A notch 212 and a cover plate 213 are provided at the housing 21, and the frame 211 includes an outer plate 2111 and a first terminal block 2112. The notch 212 has an opening 2121 formed on the outer plate 2111, wherein the notch 212 is recessed into the frame 211 in a direction from the opening 2111 toward an inside of the frame 211. The cover plate 213 is pivotally connected to the outer plate 2111, and is near the opening 2121, so that when the cover plate 213 pivots relative to the outer plate 2111, the opening 2121 could be revealed or covered. The first terminal block 2112 is fixed in the notch 212, which additionally has a first magnetic member M1 provided on an inner bottom surface 2123 of the notch 212. The electric power input 22 is fixed at the first terminal block 2112.

In the current implementation applied with the first embodiment of the present invention, the frame 211, the first seat 215, and the second seat 216 are presented as an integrally formed housing 21, wherein the outer plate 2111 of the frame 211 is an outer plate of the housing 21, and the cover plate 213 is an outer plate pivotally connected to the housing 21. The housing 21 could further include a spring 214, which pushes against an inner top wall 2122 of the notch 212 with an end thereof, and pushes against the inner wall 2131 of the cover plate 213 with another end thereof. With such design, when the cover plate 213 is driven to pivot toward the notch 212, revealing the opening 2121, the spring 214 would be twisted to store energy; when the cover plate 213 is not pivoted by an external force and is in a free condition, the spring 214 would release the stored energy to pivot the cover plate 213, whereby to cover the opening 2121.

As shown in FIG. 1, the power supply device 23 at least includes a first rechargeable battery 231 and a first charging module 232, wherein the first rechargeable battery 231 is respectively coupled to the first charging module 232 and the motorized assembly 24, while the first charging module 232 is coupled to the electric power input 22. In the current implementation, the first rechargeable battery 231 and the first charging module 232 are integrally combined to be conveniently accommodated in the frame 211.

As shown in FIG. 20 to FIG. 25, the charging device 4 at least includes an extension object 41, an electric power output 42, a power storage device 43, a conductor, an engaging portion 45, and a second terminal block 46. The extension object 41 is a hollow tube having stiffness, so that the extension object 41 could erect in a longitudinal direction thereof. The extension object 41 is provided with a first connecting portion 411 and a second connecting portion 412 in the longitudinal direction thereof, and there is a communicated space 413 provided inside the extension object 41 in the longitudinal direction of the extension object 41. The engaging portion 45 is connected to the first connecting portion 411 of the extension object 41, and the engaging portion 45 is substantially perpendicular to the longitudinal direction of the extension object 41. The electric power output 42 is fixedly provided at the second terminal block 46, and the second terminal block 46 is fixed at the engaging portion 45, so that the electric power output 42 is also fixed at the engaging portion 45. The second terminal block 46 is further provided with a second magnetic member M2. When the second terminal block 46 is fixed to the engaging portion 45, the second magnetic member M2 would be located at the bottom surface of the engaging portion 45, and would correspond to the first magnetic member M1 which is fixedly provided at the inner bottom surface 2123 of the notch 212.

Figure 24:
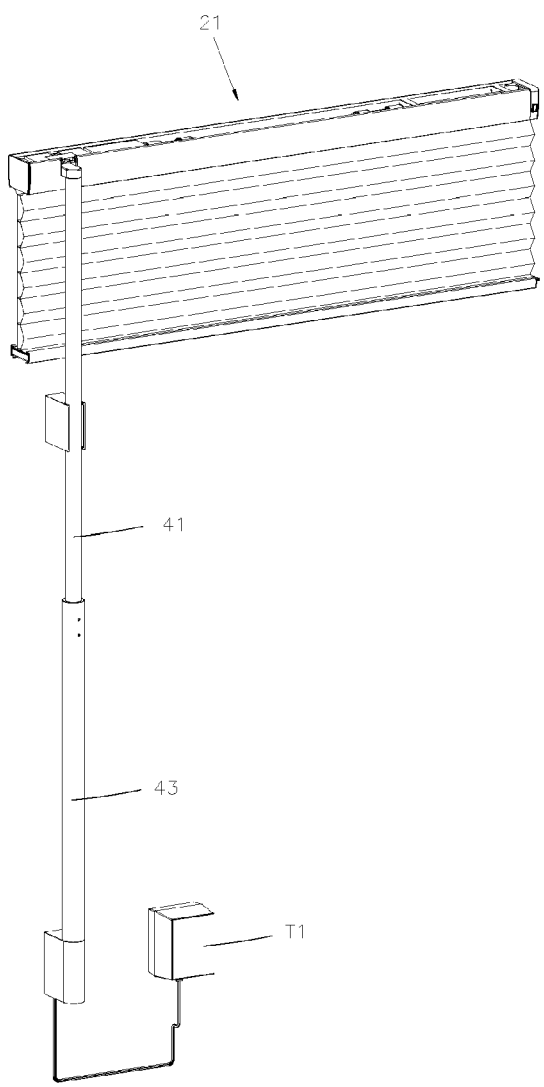
FIG. 24 is a schematic view showing the use situation of the first embodiment of the present invention.

As shown in FIG. 23 and FIG. 24, the power storage device 43 at least includes a second rechargeable battery 431 and a second charging module 432 (as shown in FIG. 11), wherein the second rechargeable battery 431 could be coupled to the second charging module 432, and the second charging module 432 could be coupled to a transformer T1. The power source for the transformer T1 is the mains electricity, whereby the mains electricity could be converted into a power source for the charging procedure through the transformer T1. In this way, the electric power could be provided to the second charging module 432, so as to charge the second rechargeable battery 431.

As shown in FIG. 22 and FIG. 23, the conductor which has electrical conductivity is presented as a wire 44a in the current embodiment. The wire 44a is provided in the extension object 41, passing through the communicated space 413, and the wire 44a has a first end 44a1 and a second end 44a2. Wherein, the first end 44a1 of the wire 44a is provided at a location corresponding to the first connecting portion 411 of the extension object 41, and the second end 44a2 is provided at a location corresponding to the second connecting portion 412 of the extension object 41. The first end 44a1 of the wire 44a is coupled to the electric power output 42, and the second end 44a2 is coupled to the second rechargeable battery 431 of the power storage device 43, so that the second rechargeable battery 431 could transmit electric power to the electric power output 42 in the longitudinal direction of the extension object 41 through the electrical conductivity of the wire 44a.

As shown in FIG. 17 to FIG. 25, when a user wants to charge the first rechargeable battery 231 of the power supply device 23 which is provided in the first seat 215, the extension object 41 should be moved toward the frame 211 first. By pushing the cover plate 213 with the engaging portion 45 of the charging device 4, the cover plate 213 would pivot toward the inside of the notch 212, which would reveal the opening 2121 of the notch 212. At the same time, the engaging portion 45 could enter the notch 212 through the opening 2121 to be fitted therein. After that, the charging device 4 could use the engaging portion 45 provided at an end of the extension object 41 to get engaged with the notch 212 of the electric window covering 2, whereby to remain connected to the frame 211 and to hang therefrom. Meanwhile, the second magnetic member M2 located at the bottom surface of the engaging portion 45 and the first magnetic member M1 fixedly provided at the inner bottom surface 2123 of the notch 212 would also stick together, whereby to further ensure the firmness of the connection between the charging device 4 and the frame 211.

In more details, when the engaging portion 45 is fitted in the notch 212, the electric power output 42 fixedly provided at the engaging portion 45 could contact the electric power input 22 fixedly provided at the notch 212, whereby to form an electrical connection. When the second rechargeable battery 431 which is coupled to the second end 44a2 of the wire 44a transmits electric power to the electric power output 42 which is coupled to the first end 44a11 of the wire 44a through the wire 44a, the electric power output 42 could transmit electric power to the first charging module through the electric power input 42 (as shown in FIG. 1), whereby to charge the first rechargeable battery 231 of the power supply device 23.

To finish the charging procedure, the extension object 41 of the charging device 4 should be moved in a direction away from the frame 211, so that the engaging portion 45 could be moved outward through the opening 2121 to get disengaged from the notch 212. At the same time, the second magnetic member M2 of the engaging portion 45 would also leave the first magnetic member M1. Furthermore, the electric power output 42 fixedly provided at the engaging portion 45 would be no longer electrically connected to the electric power input 22 of the notch 212, whereby to stop transmitting electric power to the first charging module. Once the engaging portion 45 is completely disengaged from the notch 212, the cover plate 213 would be driven by the energy, which is stored while the spring 214 is being twisted, and is released from the spring 214 now. In other words, the spring 214 would move the cover plate 213 toward an external of the notch 212 to cover the opening 2121.

The aforementioned electric window covering is provided with the power supply device 23, wherein the power supply device 23 is adapted to provide electric power to the motorized assembly 24 in general conditions, or even provide electric power to a remote control (not shown) which is used to control the operation of the motorized assembly 24. If the power stored in the power supply device 23 decreases or is insufficient, the extension object 41 which has stiffness could be used to move the charging device 4 toward the frame 211, whereby to connect the charging device 4 to the frame 211. By fitting the engaging portion 45 in the notch 212, the charging device 4 could remain connected to the frame 211 and suspended therefrom, and the position of the charging device 4 could be sustained without the need of any supportive external force. At this time, the electric power output 42 of the charging device 4 would contact the electric power input 22 provided in the frame 211, whereby the electric power stored in the power storage device 43 could be transmitted to the electric power output 42 through the wire 44a which is provided in the longitudinal direction of the extension object 41, and could be provided to the electric power input 22 as well. In this way, the electric power could be transmitted to the first charging module of the power supply device 23, so as to charge the first rechargeable battery 231.

With the charging system of the present invention, a user would not need any auxiliary tools, such as a ladder, to reach a high position to charge an electric window covering. Instead, a user could simply stand below the electric window covering 2 as normal, moving the extension object 41 of the charging device 4 toward the frame 211 of the electric window covering 2 with its longitudinal direction pointing up. After the charging device 4 is connected to the frame 211, the charging device 4 could provide electric power to the electric power input 22 provided at the frame 211, wherein the electric power would be transmitted to the power supply device 23 as the power required for the charging procedure. At this time, the charging device 4 would remain connected to the frame 211 even if not held or supported, so that the charging procedure could go on. When the power supply device 23 completes the charging procedure, the user would still only need to stand below the electric window covering 2 as normal, moving the charging device 4 away from the frame 211 and breaking the connection therebetween. In other words, a user could charge the power supply device 23 of the electric window covering 2 without the need to use any auxiliary tools to reach a high position. Furthermore, once the charging is completed, the charging device 4 could be disengaged from the frame 211 by simply being moved, which could also dismiss the downward pulling force exerted on the frame 211 by the charging device 4, whereby to prevent the frame 211 from being deformed by force.

An implementation using the charging system of the second embodiment of the present invention to perform the charging operation is illustrated in FIG. 26 to FIG. 30. The electric window covering at least includes a housing 21, an electric power input 22, a power supply device 23, and a motorized assembly 24. Similar to the designs of the aforementioned implementation for the first embodiment, the housing 21 includes a frame 211, a first seat 215, and a second seat 216, wherein the electric power input 22 is provided in the frame 211, and the power supply device 23 is respectively coupled to the electric power input 22 and the motorized assembly 24 (not shown), so that the power supply device 23 could provide the electric power needed for the motorized assembly 24.

A notch 212 is further provided in the frame 211, which has an outer plate 2111 and a first terminal block 2112. The notch 212 also has an opening 2121 formed on the outer plate 2111. The electric power input 22 is fixed at the first terminal block 2112, and the first terminal block 2112 is fixed on an inner surface 2124 of the notch 212. The outer plate 2111 at least has a third magnetic member M3 provided on an inner surface thereof at a position on a side of the opening 2121. In the current embodiment, the outer plate 2111 has two third magnetic members M3, each of which is respectively provided at a location on the outer plate 2111 on each of two sides of the opening 2121.

The power supply device 23 at least includes a first rechargeable battery 231 and a first charging module 232 (the same as the one shown in FIG. 1). In the current embodiment, the first rechargeable battery 231 and the first charging module 232 are integrally combined as one single power supply device 23, so as to be conveniently assembled in the frame 211. The power supply device 23 is respectively coupled to the electric power input 22 and the motorized assembly 24. In the current embodiment, the power supply device 23 further includes a first display unit 233, which is fixedly provided on the first seat 215, and is coupled to the first charging module 232, whereby to display the current remaining power of the power supply device 23.

The charging device 4 at least includes an extension object 41, an electric power output 42, a power storage device 43, a conductor, an engaging portion 45, a second terminal block 46, and a holder 48.

The extension object 41 is a hollow tube having stiffness, so that the extension object 41 could erect in a longitudinal direction thereof. The extension object 41 is provided with a first connecting portion 411 and a second connecting portion 412 in the longitudinal direction thereof, and there is a communicated space 413 provided inside the extension object 41 in the longitudinal direction of the extension object 41. In the current embodiment, the engaging portion 45a is connected to the first connecting portion 411 of the extension object 41, and the electric power output 42 is fixedly provided at the second terminal block 46, wherein the second terminal block 46 is fixed on the engaging portion 45a, so that the electric power output 42 is fixedly provided relative to the engaging portion 45a. The holder 48 is fixed at a bottom of the engaging portion 45a, wherein the holder 48 has two wings 481, each of which respectively extends from one side of the holder 48. A fourth magnetic member M4 is fixedly provided on a lateral side of each of wings 481 which is parallel to and in the same direction with the electric power output 42. The third magnetic members M3 and the fourth magnetic members M4 are correspondingly provided.

A conductor, which is presented as a wire 44a, is provided in and passing through the extension object 41. The first end 44a1 of the wire 44a is provided at a location near the first connecting portion 411 of the extension object 41, and the second end 44a2 is provided at a location near the second connecting portion 412 of the extension object 41. The first end 44a1 of the wire 44a is coupled to the electric power output 42, and the second end 44a2 is coupled to the power storage device 43. In the current embodiment, the second end 44a2 of the wire 44a is further coupled to a first electrical connector 49, and the power storage device 43 is coupled to a second electrical connector 50, which means the second electrical connector 50 is coupled to a second rechargeable battery (not shown) of the power storage device 43. Whereby, when the first electrical connector is combined with and electrically connected to the second electrical connector 50, the electric power of the power storage device 43 could be transmitted to the electric power output 42 in the longitudinal direction of the extension object 41 through the electrical conductivity of the wire 44a.

The power storage device 43 further includes a second charging module (the same as the one shown in FIG. 11), which is adapted to charge the power storage device 43 when coupled with the mains electricity. The power storage device 43 could further include a second display unit 433, which is coupled to the second charging module to display the current remaining power of the power storage device 43.

To charge the power supply device 23, a user could drive the extension object 41 to approach the frame 211 from below, so as to move the engaging portion 45 into the notch 212 through the opening 2121 to be fitted therein. At this time, the charging device 4 could remain connected to the frame 211 and suspended therefrom. At the same time, the electric power output 42, which is provided at the second terminal block 46 and is unmovable relative to the engaging portion 45, could be combined with and inserted into the electric power input 22, which is fixedly provided at the first terminal block 2112 and is unmovable relative to the inner surface 2124 of the notch 212. As a result, the electric power output 42 could be electrically connected to the electric power input 22. On the other hand, the fourth magnetic members M4, which are fixed at the wings 481 on two sides of the holder 48, would attract the third magnetic members M3, which are fixed at the outer plate 2111 of the frame 211, whereby the charging device 4 could be connected to the frame 211 more firmly.

When the charging device 4 remains connected to the frame 211, and when the electric power input 22 is electrically connected to the electric power output 42, the electric power of the power storage device 43 could be transmitted to the electric power output 42 through the wire 44a in the extension object 41, to the electric power input 22 provided in the frame 211, and then to the power supply device 23, so as to charge the power supply device 23. During the charging procedure, the first charging module 232 (the same as the one shown in FIG. 2) could detect the current remaining power of the first rechargeable battery 231 at any time, and could display the related information on the first display unit 233. As the remaining power of the power storage device 43 decreases, the second charging module 432 of the power storage device 43 (the same as the ones shown in FIG. 11, 16 and the FIG. 17) would also detect the remaining power of the power storage device 43 at any time, and could display the related information on the second display unit 433 for convenient checkup.

When the power supply device 23 completes the charging procedure, a user could drive the extension object 41 to move in a direction away from the frame 211. Meanwhile, the fourth magnetic members M4 would also be separated from the third magnetic members M3 as being moved outward along with the engaging portion 45, and the electric power output 42 would be no longer electrically connected to the electric power input 22 as well. Eventually, the engaging portion 45 would be disengaged from the fitting with the notch 212, and the extension object 41 would be separated from the frame 211. Till now, the charging procedure of the rechargeable battery is completed.

Figure 32:
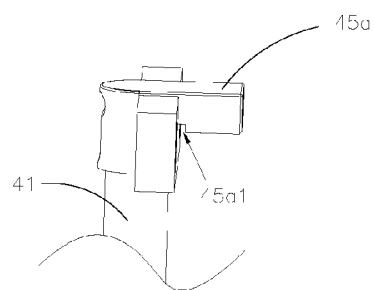
FIG. 32 is another perspective view of the engaging portion in the third embodiment of the present invention viewed from a different angle.

An implementation using the charging system of the third embodiment of the present invention to perform the charging operation is illustrated in FIG. 26, FIG. 31, and FIG. 32.

The structural arrangements of the current implementation are basically the same with those of the aforementioned implementations, and therefore we are not going to describe this part in details again. The differences between the current embodiment and the aforementioned ones are that, the engaging portion 45*a* has a groove 45*a*1 provided on a bottom surface thereof, and the notch 212 has a flange 212*5* formed on a bottom surface thereof. When the engaging portion 45*a* passes through the opening 212*1* and gets into the notch 212, a user could move the engaging portion 45*a* slightly downward to fit the groove 45*a*1 around the flange 212*5*, whereby the charging device 4 could be firmly connected to the frame 211.

Figure 33:
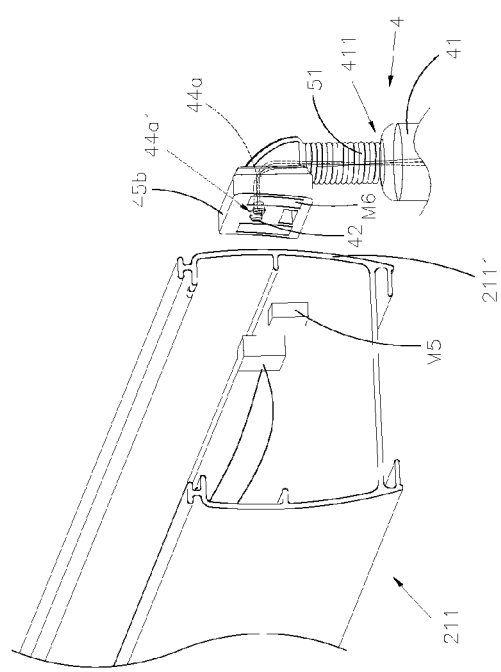
FIG. 33 is a perspective view of a fourth embodiment of the present invention.
Figure 34:
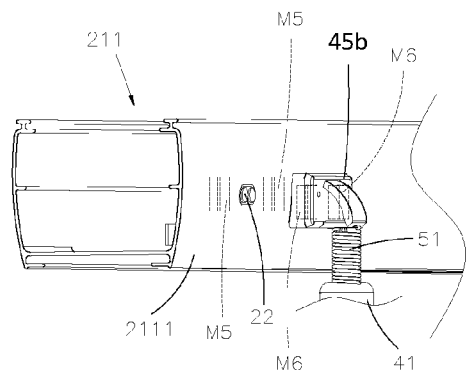
FIG. 34 is a schematic view showing the use situation of the fourth embodiment of the present invention.

An implementation using the charging system of the fourth embodiment of the present invention to perform the charging operation is illustrated in FIG. 33 and FIG. 34. The structural arrangements of the current implementation are basically the same with those of the implementation using the second embodiment of the present invention, except that the electric power input 22 is fixed on an outer surface of the outer plate 211*1* of the frame 211, and there is a fifth magnetic member M5 fixedly provided at a position on an inner surface of the outer plate 211*1* near the electric power input 22. In the current embodiment, an engaging portion 45*b* with another design is also disclosed, which is provided in a manner that it is inseparable from the first connecting portion 411 of the extension object 41. The charging device 4 further includes a vibration absorbing member 51, which is respectively connected to the engaging portion 45*b* and the first connecting portion 411 of the extension object 41 with two ends thereof. Therefore, the engaging portion 45*b* is indirectly connected to the first connecting portion 411 through the vibration absorbing member 51. The electric power output 42 is fixed on the engaging portion 45*b*, wherein the engaging portion 45*b* has a sixth magnetic member M6 fixedly provided at a location thereon near the electric power output 42, which corresponds to the fifth magnetic member M5. The first end 44*a*1 of the wire 44*a* passes through the vibration absorbing member 51 to be coupled to the electric power output 42.

To charge the power supply device 23, a user could move the charging device 4 to make the sixth magnetic member M6 fixed at the engaging portion 45*b* and the fifth magnetic member M5 fixed at the outer plate 211*1* of the frame 211 attract each other, whereby the charging device 4 could be connected to the frame 211. At this time, the electric power output 42 fixed at the engaging portion 45*b* would contact the electric power input 22 fixed at the outer plate 211*1*, so that the electric power transmitted to the electric power output 42 could be further transmitted to the electric power input 22, whereby to charge the power supply device 23. During the charging procedure, if someone bumps into the charging device 4 by accident, the impact would be absorbed by the vibration absorbing member 51, and therefore the charging device 4 would only swing relative to the frame 211 without affecting the firmness of the connection between the engaging portion 45*b* of the charging device 4 and the frame 211.

Figure 37A:
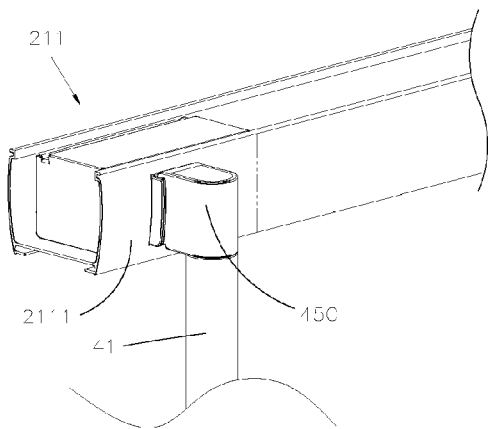
FIG. 37A is a schematic view of the use situation of the fifth embodiment of the present invention.
Figure 37B:
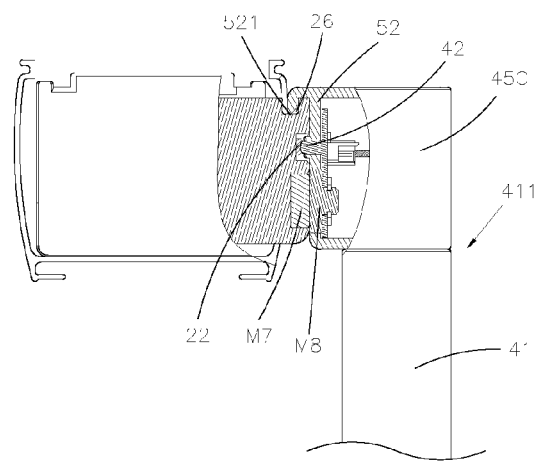
FIG. 37B is a sectional schematic view of FIG. 37A, showing the engagements between the fitting end and the fitting slot, and between the electric power output and the electric power input.
Figure 38:
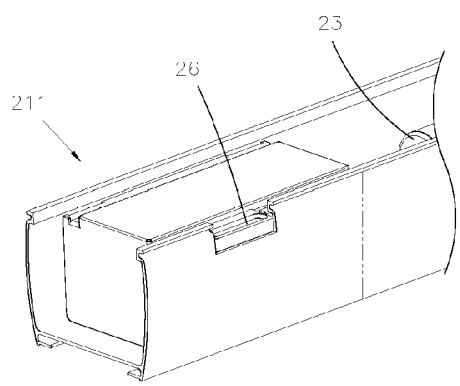
FIG. 38 is a perspective view of the frame applied with a sixth embodiment of the present invention.

An implementation using the charging system of the fifth embodiment of the present invention to perform the charging operation is illustrated in FIG. 35 to FIG. 37, wherein the electric power input 22 is fixed at an outer surface of the outer plate 211*1* of the frame 211. The main difference between the current implementation and the aforementioned ones is that, there are a fitting slot 26 and a seventh magnetic member M7 provided at locations on an outer surface of outer plate 211*1* of the frame 211 near the electric power input 22. An engaging portion 45*c* with another design is connected to the first connecting portion 411 of the extension object 41, and a fitting portion 52 is connected to a top of the engaging portion 45*c*, so that a fitting end 521 extending outward and downward is formed on the top of the engaging portion 45*c*. In addition, an eighth magnetic member M8 is provided at the engaging portion 45*c*, and is near the electric power output 42, wherein the fitting end 521 and the fitting slot 26 are correspondingly provided, and the seventh magnetic member M7 and the eighth magnetic member M8 are correspondingly provided.

To charge the power supply device (not shown), a user could drive the extension object 41 of the charging device 4 to approach the frame 211, and make the fitting end 521 of the fitting portion 52 fit into the fitting slot 26. At this time, the eighth magnetic member M8 fixed at the engaging portion 45*c* and the seventh magnetic member M7 fixed at the frame 211 would stick together, so that the extension object 41 of the charging device 4 could be connected to the frame 211 and suspended therefrom. When the charging device 4 and the frame 211 remain connected, the electric power output 42 fixed at the engaging portion 45*c* would contact the electric power input 22 fixed at the outer surface of the outer plate 211*1* of the frame 211, whereby the electric power from the charging device 4 could be transmitted to the electric power input 22, charging the power supply device.

An implementation using the charging system of the sixth embodiment of the present invention to perform the charging operation is illustrated in FIG. 38 to FIG. 41, wherein the charging device 4 could be connected to the frame 211 and suspended therefrom by fitting and engaging the fitting end 521 of the fitting portion 52, which is connected to the engaging portion 45*c*, into the fitting slot fixed at the frame 211. The difference between the current embodiment and the aforementioned ones is that, the electric power input 22 provided at the frame 211 includes a receiver coil module 221, which is fixed at an inner surface of the outer plate 211*1* of the frame 211. The receiver coil module 221 is coupled to the power supply device (not shown), wherein the receiver coil module 221 could receive an electromagnetic signal, which could induce an electric power in the receiver coil module 221, whereby the induced electric power could be provided to the power supply device for the charging procedure. The electric power output 42 of the charging device 4 includes a transmitter coil module 421, which is coupled to the extension object 41 or the wire 44*a* adapted to transmit the electric power. Therefore, when the electric power of the power storage device 43 is transmitted to the transmitter coil module 421, the electric power could be converted into electromagnetic signals to be sent out.

When it is required to charge the power supply device 43 and therefore the charging device 4 is connected to the frame 211 to be suspended therefrom, the transmitter coil module 421 fixed at the engaging portion 45*c* and the receiver coil module 221 fixed at the frame 211 would be close enough to get into an electromagnetic-signal-sensible distance, so that the electromagnetic signals transmitted by the transmitter coil module 421 could induce an electric power in the receiver coil module 221, and then the induced electric power could be transmitted to the power supply device 23 for performing the charging procedure.

In the current embodiment, the electric power could be transmitted between the electric power output 42 of the charging device 4 and the electric power input 22 provided at the frame 211 through electromagnetic induction. Therefore, the electric power output 42 and the electric power input 22 could be fixedly provided at the engaging portion

45*c* of the charging device 4 and the internal of the frame 211, respectively. When the electric power output 42 and the electric power input 22 are close enough to get into the electromagnetic-signal-sensible distance, the electric power could be transmitted without physical contact between the electric power output and the electric power input, whereby to increase the convenience in use.

An implementation using the charging system of the seventh embodiment of the present invention to perform the charging operation is illustrated in FIG. 42 to FIG. 46. The difference between the current implement and the aforementioned ones is that, there is an engaging portion 45*d* with another type of design connected to the first connecting portion 411 of the extension object 41. Said engaging portion 45*d* has an open end surface 45*d*1, which could be planar, bulged, or recessed. In the current embodiment, the open end surface 45*d*1 is recessed to form a circular groove 45*d*11. The electric power output 42 is fixedly provided in the circular groove 45*d*11. A block member 45*d*2 is formed in a radial direction of the engaging portion 45*d*, and protrudes out of an outer surface of the engaging portion 45*d*. The notch 212 is fixedly provided at the frame 211, and the shape of the opening 2121 formed by the notch 212 on the outer plate 2111 corresponds to an outline of the engaging portion 45*d*2. The opening 2121 has an inner wall 21211 and a stop member 21212 which is formed from the inner wall 21211 toward a center thereof in a radial direction thereof. The frame 211 has a first terminal block 2112*d* with another type of design, and the electric power input 22 is fixedly provided at the first terminal block 2112*d*, wherein the first terminal block 2112*d* corresponds to the opening 2121, and the first terminal block 2112*d* and the circular groove 45*d*11 are correspondingly provided as well, so that the first terminal block 2112*d* could be placed into the circular groove 45*d*11.

To charge the power supply device (not shown), a user could move the extension object 41, and drive the extension object 41 in a way that the block member 45*d*2 of the engaging portion 45*d* and the stop member 21212 of the opening 2121 stagger, so that the engaging portion 45*d* could be placed into the frame 211 through the opening 2121 and the notch 212. At this time, the first terminal block 2112*d* would also be placed in the circular groove 45*d*11. In addition, the electric power output 42 fixedly provided in the circular groove 45*d*11 and the electric power input 22 fixedly provided at first terminal block 2112*d* would stagger as well. By further rotating the extension object 41, the block member 45*d*2 could be moved to a position that the block member 45*d*2 is behind or partially behind the stop member 21212, so that the block member 45*d*2 would be stopped by the stop member 21212, and the engaging portion 45*d* would be fixed to the frame 211 in this way. Whereby the charging device 4 could be firmly connected to the frame 211. At this time, the electric power output 42 fixedly provided in the circular groove 45*d*11 would contact the electric power input 22 fixedly provided at first terminal block 2112*d*, so that the electric power transmitted to the electric power output 42 could be transmitted to the electric power input 22, charging the power supply device 23.

To stop charging the power supply device 23, a user could drive the extension object 41 in an opposite direction to stagger the block member 45*d*2 of the engaging portion 45*d* and the stop member 21212 of the opening 2121 again. In this way, the engaging portion 45*d* could be disengaged from the frame 211 through the opening 2121, separating the first terminal block 2112*d* and the circular groove 45*d*11. At this time, the electric power output 42 would be no longer electrically connected to the electric power input 22. Therefore, the electric power output 42 could stop providing electric power to the electric power input 22.

In the current embodiment, the block member 45*d*2 which extends in the axial direction of the engaging portion 45*d* has an engaging groove 45*d*3 provided at a rear side thereof, wherein a width of the engaging groove 45*d*3 corresponds to a thickness of the stop member 21212 of the opening 2121. Whereby, when the block member 45*d*2 partially or completely overlaps the stop member 21212, the stop member 21212 could be partially or completely engaged in the engaging groove 45*d*3. In this way, the engaging groove 45*d*3 could prevent the stop member 21212 from being moved in the axial direction of the engaging portion 45*d*.

Figure 47:
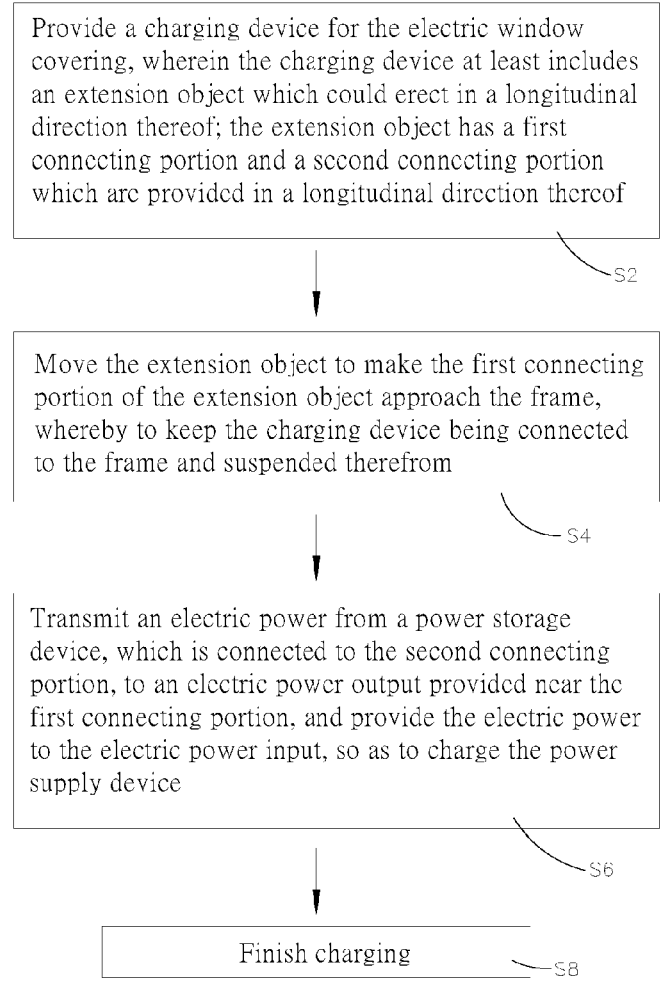
FIG. 47 is a flowchart of the method of charging the electric window covering.

A method of charging electric window covering with the charging system of the present invention is illustrated in FIG. 47, wherein the electric window covering at least includes an electric power input, a rechargeable power supply device, and a motorized assembly adapted to control the movement of the electric window covering. The electric power input is provided in a frame, and is coupled to the power supply device. The power supply device is coupled to the motorized assembly to provide electric power to the motorized assembly. The steps of the method include:

Step S2: provide a charging system for the electric window covering, wherein the charging system includes a charging device, wherein the charging device at least includes an extension object which could erect in a longitudinal direction thereof. The extension object has a first connecting portion and a second connecting portion which are provided in a longitudinal direction thereof;

Step S4: move the extension object to make the first connecting portion of the extension object approach the frame, whereby to keep the charging device being connected to the frame and suspended therefrom;

Step S6: transmit an electric power from a power storage device, which is connected to the second connecting portion, to an electric power output provided near the first connecting portion, and provide the electric power to the electric power input, so as to charge the power supply device;

Step S8: finish charging.

Figure 49:
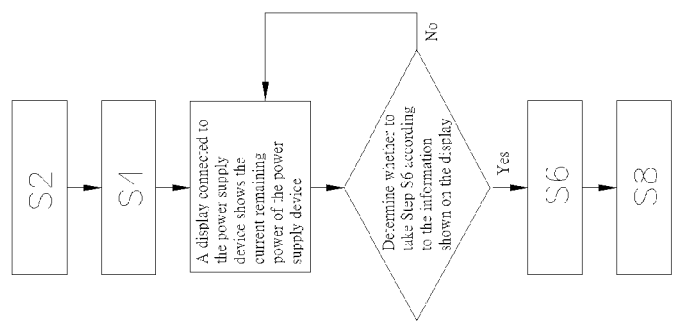
FIG. 49 is a flowchart of a second charging method, which is also applied with a display.
Figure 48:
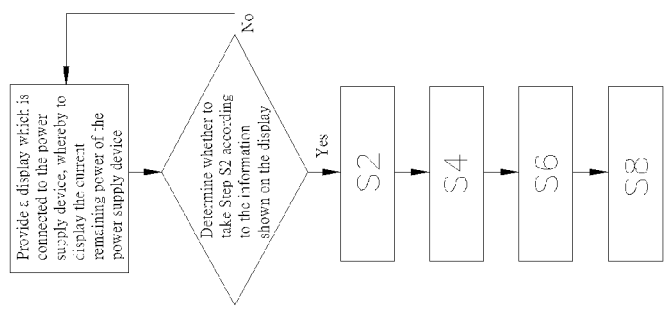
FIG. 48 is a flowchart of a first charging method, which is applied with a display.

In practice, the power supply device could be connected to a display, whereby to show the current remaining power of the power supply device through the display. Therefore, before taking step S2, the information shown on the display could be used to determine if it is needed to take step S2 or not (as shown in FIG. 48). Alternatively, the display could be connected to the charging device instead, whereby, after taking Step S4, the current remaining power of the power supply device could be shown on the display, which could be used as a basis for determining whether to further take Step S6 (as shown in FIG. 49).

Figure 50:
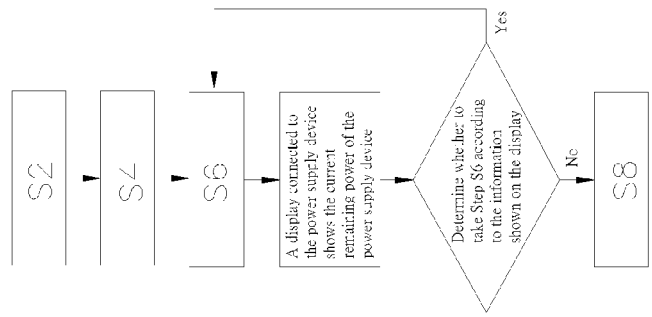
FIG. 50 is a flowchart of a third charging method, which is still applied with a display.

Additionally, in Step S2, a length of the extension object in the longitudinal direction thereof could be adjusted as required. More specifically, the length of the extension object could be changed according to the height of where the frame or the housing of the electric window covering is located, and therefore the charging procedure could be easily performed. In addition, between Step S6 and Step S8, a user could use the information shown on the display to determine whether to continue taking Step S6 (as shown in FIG. 50). In Step S8, the charging procedure could be ended by removing the extension object. Alternatively, there could be a switching circuit provided at the power supply device, wherein the switching circuit includes a switch, and is respectively coupled to the charging module and the electric power input. In such a case, by switching off the switch to break the coupling to the electric power input, the charging procedure in Step S6 could be ended.

By utilizing the charging device with the extension object which could erect in the longitudinal direction thereof, a user could perform a charging operation to the power supply device of the electric window covering which is located at a high location, without the need to use any additional tools. Furthermore, a user could monitor the remaining power status of the power supply device of the electric window covering at any time, which would increase the practicality of the electric window covering.

It must be pointed out that the embodiments described above are only some preferred embodiments of the present invention. All equivalent structures and methods which employ the concepts disclosed in this specification and the appended claims should fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging system for an electric window covering, wherein the electric window covering comprises: a motorized assembly, which controls a movement of a covering material of the electric window covering, and a power supply device, which comprises a rechargeable power unit and a first remaining power detection circuit; wherein the rechargeable power unit is coupled to and provides power to the motorized assembly, and the first remaining power detection circuit is coupled to the rechargeable power unit to detect a potential magnitude of the rechargeable power unit; the first remaining power detection circuit also generates and outputs a potential signal; the charging system comprising:
   a comparison module coupled to the first remaining power detection circuit, wherein the potential signal outputted by the first remaining power detection circuit is inputted into the comparison module; when the potential magnitude represented by the potential signal is less than a threshold predetermined in the comparison module, the comparison module generates and outputs a warning notice signal;
   a notification unit comprising a presenting module, wherein the presenting module receives the warning notice signal and represents a warning notice representing the warning notice signal;
   a charging device comprising an extension object with stiffness, an electric power output, and a power storage device; and
   a conductor provided in a longitudinal direction of the extension object and comprising a first end and a second end, wherein the first end is coupled to the electric power output and the second end is coupled to the power storage device for providing a power of the power storage device to the electric power output via the conductor;
   wherein, when the presenting module represents the warning notice, the electric power output of the charging device is adapted to be operably coupled to the rechargeable power unit, whereby the electric power output provides the power to the rechargeable power unit to charge the rechargeable power unit;
   wherein the electric power output of the charging device is adapted to be operably disengaged from the rechargeable power unit, and the motorized assembly controls the movement of the covering material of the electric window covering without the charging device coupled to the rechargeable power unit.

2. The charging system of claim 1, wherein the presenting module comprises a visual notification generating component.

3. The charging system of claim 1, wherein the presenting module comprises an audio notification generating component.

4. The charging system of claim 1, wherein the presenting module comprises a tactile notification generating component.

5. The charging system of claim 1, wherein the electric window covering further comprises a housing, and the notification unit is disposed at the housing; the comparison module is coupled to the presenting module of the notification unit; the warning notice signal outputted by the comparison module is transmitted to the presenting module to present the warning notice.

6. The charging system of claim 1, wherein the charging system further comprises a first fixing structure and a second fixing structure; the first fixing structure is disposed at an end of the extension object relative to the first end of the conductor; the electric window covering further comprises a frame and an electric power input, wherein the electric power input and the second fixing structure are respectively disposed at the frame, and the electric power input is coupled to the rechargeable power unit; when the first fixing structure and the second fixing structure are connected, the electric power output provides the power to the rechargeable power unit through the electric power input; when the first fixing structure and the second fixing structure are separated, the electric power output stops providing the power to the rechargeable power unit.

7. The charging system of claim 6, wherein the comparison module is coupled to the electric power input, and the notification unit is disposed at the charging device; the presenting module of the notification unit is coupled to the electric power output; when the first fixing structure and the second fixing structure are connected, the warning notice signal outputted by the comparison module is transmitted to the presenting module through the electric power input and the electric power output to present the warning notice.

8. The charging system of claim 1, wherein the charging system comprises a first wireless transceiver module, which is coupled to the comparison module, and receives the warning notice signal outputted by the comparison module; the notification unit comprises a second wireless transceiver module, which is coupled to the presenting module; the warning notice signal is transmitted to the presenting module through the first wireless transceiver module and the second wireless transceiver module, whereby the presenting module presents the warning notice accordingly.

9. The charging system of claim 8, wherein the notification unit is disposed at the charging device.

10. The charging system of claim 1, wherein the notification unit is disposed at a portable device.

11. The charging system of claim 1, wherein the presenting module is driven to present the warning notice periodically.

* * * * *